US012763033B2

(12) United States Patent
Kim

(10) Patent No.: US 12,763,033 B2
(45) Date of Patent: Oct. 13, 2026

(54) DISPLAY MODULE AND ELECTRONIC DEVICE INCLUDING THE DISPLAY MODULE

(71) Applicant: Samsung Display Co., LTD., Yongin-si (KR)

(72) Inventor: Sanghun Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/350,023

(22) Filed: Oct. 5, 2025

(65) Prior Publication Data

US 2026/0229187 A1 Aug. 6, 2026

(30) Foreign Application Priority Data

Feb. 5, 2025 (KR) ........................ 10-2025-0014177

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01); *G09G 2300/0842* (2013.01); *G09G 2300/0861* (2013.01); *G09G 2310/0286* (2013.01); *G09G 2310/08* (2013.01); *G09G 2320/0238* (2013.01); *G09G 2330/021* (2013.01)

(58) Field of Classification Search
CPC ............... G09G 3/3233; G09G 3/3266; G09G 2300/0819; G09G 2300/0842; G09G 2300/0861; G09G 2310/0286; G09G 2310/08; G09G 2320/0238; G09G 2330/021
See application file for complete search history.

(56) References Cited

U.S. PATENT DOCUMENTS

2023/0197011 A1* 6/2023 Hong .................. G09G 3/3233 345/212
2023/0368730 A1 11/2023 Yamamoto et al.
2024/0046844 A1* 2/2024 Feng .................... G09G 3/2092
2024/0221624 A1* 7/2024 Shin .......................... G09G 3/20
2024/0233633 A1 7/2024 Yonebayashi

FOREIGN PATENT DOCUMENTS

KR 1020240078603 A 6/2024

* cited by examiner

*Primary Examiner* — Hang Lin
(74) *Attorney, Agent, or Firm* — CANTOR COLBURN LLP

(57) ABSTRACT

A display module includes a plurality of pixels and a gate driving circuit. The gate driving circuit includes a plurality of stages electrically connected with the plurality of pixels. A first stage among the plurality of stages receives a high signal having a first potential, a low signal having a second potential lower than the first potential, and a first clock signal. The first stage includes a first charging unit, a first inverting unit, a first main boosting unit, a first main output unit, and a first sub-output unit. The first charging unit includes a first main capacitor disposed between a first upper charging node and a first lower charging node. The first inverting unit transfers the high signal to a first output node or electrically connects the first lower charging node to the first output node according to the first clock signal.

20 Claims, 22 Drawing Sheets

DISPLAY MODULE AND ELECTRONIC DEVICE INCLUDING THE DISPLAY MODULE

This application claims priority to Korean Patent Application No. 10-2025-0014177, filed on Feb. 5, 2025, and all the benefits accruing therefrom under 35 U.S.C. § 119, the content of which in its entirety is herein incorporated by reference.

BACKGROUND

1. Field

The present disclosure relates to a display module and an electronic device including the display module. More specifically, the present disclosure relates to a display module in which power consumption for generating a clock signal is reduced and the operating speed of a gate driving circuit is improved, and an electronic device including the display module.

2. Description of the Related Art

A display module includes a plurality of pixels and a gate driving circuit. The gate driving circuit provides a gate control signal, and the plurality of pixels are controlled based on the gate control signal. The gate driving circuit is controlled by various electrical signals, including a clock signal, a high signal, and a low signal.

In conventional technology, the gate driving circuit generates the gate control signal using a portion of the clock signal. To improve the resolution of the display module or enhance the operating speed of the gate driving circuit, a clock signal with a greater amplitude may be desired. Consequently, generating a clock signal having a greater amplitude may lead to increased power consumption.

SUMMARY

An object of the present disclosure is to provide a display module and an electronic device including the display module, in which gate control signals with a greater amplitude are generated using high and low signals instead of a clock signal itself, thereby reducing power consumption associated with generating the clock signal.

An aspect of the present disclosure provides a display module, which may include, according to an embodiment, a plurality of pixels and a gate driving circuit. The gate driving circuit may include a plurality of stages electrically connected to the plurality of pixels. Among the plurality of stages, a first stage may receive a high signal having a first potential, a low signal having a second potential lower than the first potential, and a first clock signal.

The first stage may include a first charging unit, a first inverting unit, a first main boosting unit, a first main output unit, and a first sub-output unit. The first charging unit may include a first main capacitor disposed between a first upper charging node and a first lower charging node. The first inverting unit may transmit the high signal to a first output node or electrically connect the first lower charging node to the first output node based on the first clock signal. The first main boosting unit may transfer the low signal to the first upper charging node according to the potential of the first output node.

The first main output unit may provide a first non-inverted output signal to at least one of the plurality of pixels according to the potential of the first output node. The first sub-output unit may provide a first inverted output signal to at least one of the plurality of pixels according to the potential of the first output node and the potential of the first non-inverted output signal. One of the first non-inverted output signal and the first inverted output signal may be the high signal, and the other may be the low signal.

In an embodiment, the first charging unit may charge the first main capacitor with a charge amount corresponding to a potential difference between the high signal and the low signal based on one of an initialization signal and a carry signal and of the first clock signal. The carry signal may be an electrical signal received from a stage other than the first stage among the plurality of stages.

In an embodiment, the first main output unit may include a first upper main output transistor and a first lower main output transistor. The first upper main output transistor and the first lower main output transistor may be controlled such that one of the first upper main output transistor and the first lower main output transistor is turned on while the other is turned off according to the potential of the first output node. The first sub-output unit may include a first upper sub-output transistor and a first lower sub-output transistor. The first upper sub-output transistor may be controlled by the potential of the first non-inverted output signal and provide the high signal as the first inverted output signal. The first lower sub-output transistor may be controlled by the potential of the first output node and provide the low signal as the first inverted output signal.

In an embodiment, among the plurality of stages, a second stage may receive the high signal, the low signal, and a second clock signal. The second stage may include a second charging unit, a second inverting unit, a second main boosting unit, a second main output unit, and a second sub-output unit. The second charging unit may include a second main capacitor disposed between a second upper charging node and a second lower charging node. The second inverting unit may transfer the high signal to a second output node or electrically connect the second lower charging node to the second output node based on the second clock signal. The second main boosting unit may transfer the low signal to the second upper charging node according to the potential of the second output node. The second main output unit may provide a second non-inverted output signal to at least one of the plurality of pixels according to the potential of the second output node. The second sub-output unit may provide a second inverted output signal to at least one of the plurality of pixels according to the potential of the second output node and the potential of the second non-inverted output signal. One of the second non-inverted output signal and the second inverted output signal may be the high signal, and the other may be the low signal. The first stage may further include a first main initialization unit, which may provide the high signal to the first lower charging node based on one of the second non-inverted output signal and the second inverted output signal. In an embodiment, the first clock signal and the second clock signal may have different phases with respect to one another.

In an embodiment, a stage initialization signal may be further provided to the first stage. The first stage may further include a first sub-initialization unit, which may transfer the high signal to the first lower charging node based on the stage initialization signal.

In an embodiment, the first clock signal may be an electrical signal which swings between the first potential and the second potential. The duration for which the potential of the first clock signal remains at the first potential may be shorter than the duration for which the potential of the clock signal remains at the second potential.

In an embodiment, the first stage may further include a first sub-boosting unit including a first sub-capacitor. The first sub-capacitor may be disposed between the first upper charging node and a first sub-boosting node. The first sub-boosting node may be electrically connected with the first inverting unit. The first sub-capacitor may be charged, or the first sub-boosting node may be electrically connected to the first output node, according to the first clock signal.

A display module according to another embodiment of the present disclosure may include a plurality of pixels and a gate driving circuit. The gate driving circuit may include a plurality of stages electrically connected with the plurality of pixels. Among the plurality of stages, a first stage may include a first upper output terminal, a first carry terminal, a first high-potential terminal, a first low-potential terminal, a first clock terminal, a first input terminal, a first upper input transistor, a first lower input transistor, a first main capacitor, a first lower inverting transistor, a first upper inverting transistor, a first main boosting transistor, a first upper main output transistor, and a first lower main output transistor.

The first upper output terminal may transfer a first non-inverted output signal to at least one of the plurality of pixels. The first carry terminal may be electrically connected to the first upper charging node and a second stage among the plurality of stages. The first high-potential terminal may receive a high signal having a first potential. The first low-potential terminal may receive a low signal having a potential lower than the first potential. The first clock terminal may receive a first clock signal. The first input terminal may receive one of an initialization signal and a carry signal. The carry signal may be an electrical signal received from a stage other than the first stage among the plurality of stages.

The first upper input transistor may turn on or off based on the first clock signal. The first upper input transistor may be disposed between the first high-potential terminal and the first upper charging node. The first lower input transistor may turn on or off based on the potential of the first input terminal. The first lower input transistor may be disposed between the first upper charging node, which is insulated from the first lower charging node, and the first low-potential terminal.

The first main capacitor may be disposed between the first upper input transistor and the first lower input transistor. The first lower inverting transistor may turn on or off based on the potential of the first clock terminal. The first lower inverting transistor may be disposed between the first lower charging node and the first output node.

The first upper inverting transistor may turn on or off based on the potential of the first clock terminal. The first upper inverting transistor may be disposed between the first lower inverting transistor and the first high-potential terminal. The first main boosting transistor may turn on or off according to the potential of the first output node. The first main boosting transistor may be disposed between the first low-potential terminal and the first upper charging node.

The first upper main output transistor may turn on or off according to the potential of the first output node. The first upper main output transistor may be disposed between the first high-potential terminal and the first upper output terminal. The first lower main output transistor may turn on or off according to the potential of the first output node. The first lower main output transistor may be disposed between the first low-potential terminal and the first upper output terminal.

According to an embodiment of the present disclosure, the display module may further include a first lower output terminal, a first upper sub-output transistor, and a first lower sub-output transistor. The first lower output terminal may transfer a first inverted output signal to at least one of the plurality of pixels. The first upper sub-output transistor may turn on or off based on the potential of the first non-inverted output signal. The first upper sub-output transistor may be disposed between the first high-potential terminal and the first lower output terminal. The first lower sub-output transistor may turn on or off based on the potential of the output node. The first lower sub-output transistor may be disposed between the first low-potential terminal and the first lower output terminal.

In an embodiment, one of the first upper main output transistor and the first lower main output transistor may be an NMOS transistor, and the other may be a PMOS transistor.

In an embodiment, the first upper main output transistor and the first lower main output transistor may be controlled such that one of the first upper main output transistor and the first lower main output transistor turns on while the other turns off according to the potential of the first output node. One of the first non-inverted output signal and a first inverted output signal may be the high signal, and the other may be the low signal.

In an embodiment, the second stage may include a second upper output terminal, a second lower output terminal, a second high-potential terminal, a second clock terminal, a second input terminal, a second upper input transistor, a second lower input transistor, a second main capacitor, a second lower inverting transistor, a second upper inverting transistor, a second main boosting transistor, a second upper main output transistor, a second lower main output transistor, a second upper sub-output transistor, and a second lower sub-output transistor.

The second upper output terminal may transfer a second non-inverted output signal to at least one of the plurality of pixels. The second lower output terminal may transfer a second inverted output signal to at least one of the plurality of pixels. The second high-potential terminal may receive the high signal. The second low-potential terminal may receive the low signal. The second clock terminal may receive a second clock signal.

The second input terminal may be electrically connected with the first carry terminal of the first stage. The second input terminal may turn on or off based on the second clock signal. The second upper input transistor may be disposed between the second high-potential terminal and a second upper charging node. The second upper input transistor may turn on or off based on the potential of the second input terminal. The second lower input transistor may be disposed between a second lower charging node, which is electrically insulated from the second upper charging node, and the second low-potential terminal.

The second main capacitor may be disposed between the second upper input transistor and the second lower input transistor. The second lower inverting transistor may turn on or off based on the potential of the second clock terminal. The second lower inverting transistor may be disposed between the second lower charging node and the second output node. The second upper inverting transistor may turn on or off based on the potential of the second clock terminal. The second upper inverting transistor may be disposed between the second lower inverting transistor and the second high-potential terminal.

The second main boosting transistor may turn on or off according to the potential of the second output node. The second main boosting transistor may be disposed between the second low-potential terminal and the second upper charging node. The second upper main output transistor may turn on or off according to the potential of the second output node. The second upper main output transistor may be disposed between the second high-potential terminal and the second upper output terminal. The second lower main output transistor may turn on or off according to the potential of the second output node. The second lower main output transistor may be disposed between the second low-potential terminal.

The second upper sub-output transistor may turn on or off based on the potential of the second non-inverted output signal. The second upper sub-output transistor may be disposed between the second high-potential terminal and the second lower output terminal. The second lower sub-output transistor may turn on or off according to the potential of the output node. The second lower sub-output transistor may be disposed between the second low-potential terminal and the second lower output terminal.

The first stage may further include a first main initialization terminal and a first main initialization transistor. The first main initialization terminal may be electrically connected with one of the second upper output terminal and the second lower output terminal. The first main initialization transistor may turn on or off based on the potential of the first main initialization terminal. The first main initialization transistor may be disposed between the first lower charging node and the first high-potential terminal.

In an embodiment, the first clock signal and the second clock signal may have different phases with respect to one another.

In an embodiment, the first clock signal may be an electrical signal which swings between the first potential and the second potential. The duration for which the potential of the first clock signal remains at the first potential may be shorter than the duration for which the potential of the clock signal remains at the second potential. The second clock signal may be an electrical signal which swings between the first potential and the second potential. The duration for which the potential of the second clock signal remains at the first potential may be shorter than the duration for which the potential of the clock signal remains at the second potential.

In an embodiment, the first stage may further include a first sub-initialization terminal and a first sub-initialization transistor. The first sub-initialization terminal may receive a stage initialization signal. The first sub-initialization transistor may turn on or off based on the potential of the first sub-initialization terminal. The first sub-initialization transistor may be disposed between the first lower charging node and the first high-potential terminal.

In an embodiment, the first stage may further include a first sub-capacitor. The first sub-capacitor may be disposed between the first upper charging node and the first upper inverting transistor.

Another aspect of the present disclosure provides an electronic device, which may include, according to an embodiment, a display module, a processor, a memory, and a power module. The display module may be configured to emit light. The processor may be configured to control the display module. The memory may be configured to store data necessary for the operation of the display module or the processor. The power module may be configured to generate or supply power.

The display module may include a plurality of pixels and a gate driving circuit. The gate driving circuit may include a plurality of stages electrically connected with the plurality of pixels. Among the plurality of stages, a first stage may receive a high signal having a first potential, a low signal having a second potential lower than the first potential, and a first clock signal.

The first stage may include a first charging unit, a first inverting unit, a first main boosting unit, a first main output unit, and a first sub-output unit. The first charging unit may include a first main capacitor disposed between a first upper charging node and a first lower charging node. The first inverting unit may transfer the high signal to a first output node or electrically connect the first lower charging node to the first output node based on the first clock signal. The first main boosting unit may transfer the low signal to the first upper charging node according to the potential of the first output node.

The first main output unit may provide a first non-inverted output signal to at least one of the plurality of pixels based on the potential of the first output node. The first sub-output unit may provide a first inverted output signal to at least one of the plurality of pixels based on the potential of the first output node and the potential of the first non-inverted output signal. One of the first non-inverted output signal and the first inverted output signal may be the high signal, and the other may be the low signal.

In an embodiment of the present disclosure, the first main output unit may include a first upper main output transistor and a first lower main output transistor. The first upper main output transistor and the first lower main output transistor may be controlled such that one of the first upper main output transistor and the first lower main output transistor turns on while the other of the first upper main output transistor and the first lower main output transistor turns of according to the potential of the first output node. The first sub-output unit may include a first upper sub-output transistor and a first lower sub-output transistor. The first upper sub-output transistor may provide the high signal as the first inverted output signal based on the potential of the first non-inverted output signal. The first lower sub-output transistor may provide the low signal as the first inverted output signal based on the potential of the first output node.

In an embodiment, the first stage may further include a first sub-boosting unit including a first sub-capacitor. The first sub-capacitor may be disposed between the first upper charging node and a first sub-boosting node. The first sub-boosting node may be electrically connected with the first inverting unit. The first sub-capacitor may be charged, or the first sub-boosting node may be electrically connected to the first output node, according to the first clock signal.

According to an embodiment of the present disclosure, a high signal and a low signal are used instead of a clock signal to generate gate control signals with a greater amplitude, thereby providing a display module with reduced power consumption for generating the clock signal, and an electronic device including such a display module.

BRIEF DESCRIPTION OF THE DRAWINGS

These and/or other features will become apparent and more readily appreciated from the following description of the embodiments, taken in conjunction with the accompanying drawings in which.

DETAILED DESCRIPTION

Figure 1:
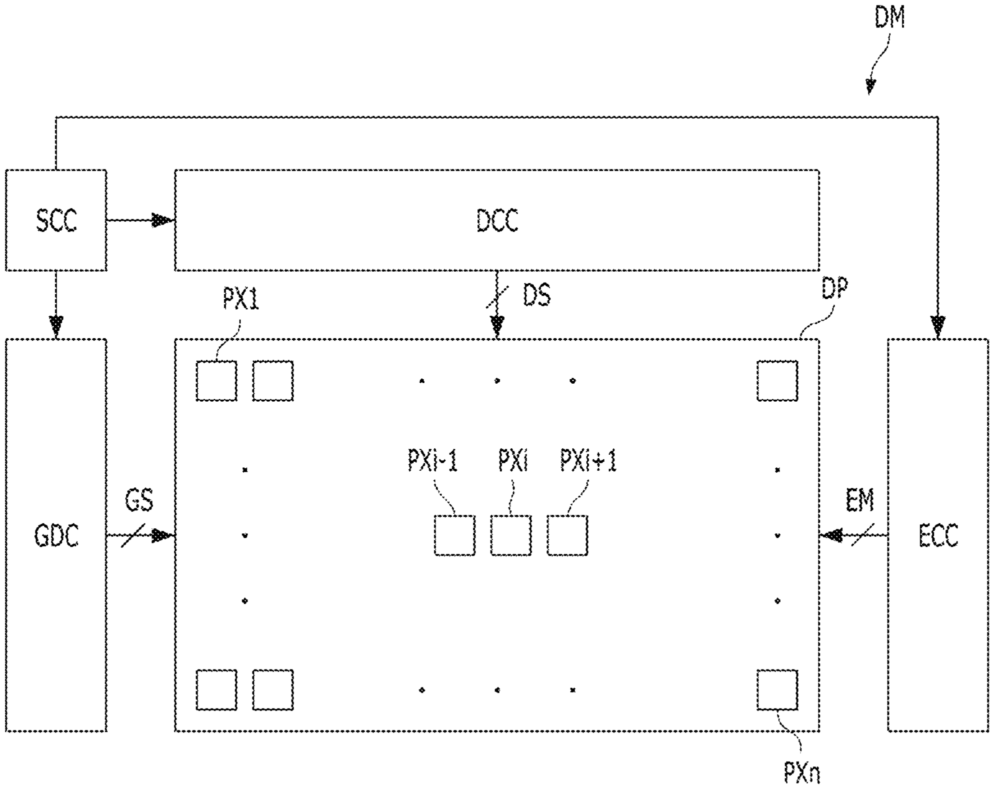
FIG. 1 is an example block diagram illustrating a display module according to an embodiment of the present disclosure.

References will now be made in detail to certain embodiments, of which examples are illustrated in the accompanying drawings, where like reference numerals refer to like elements throughout. The embodiments may have a variety of forms and permutations, but the present disclosure shall by no means be construed as being limited to the described embodiments. Rather, the present disclosure shall be construed to encompass all forms, permutations, equivalents and substitutes covered by the technical ideas and scope of the present disclosure. Accordingly, the example embodiments are merely described herein, by referring to the figures, to explain features of the present disclosure.

Like or identical reference numerals refer to like or identical elements. Moreover, in the accompanying drawings, the thicknesses, ratios, and dimensions of the elements may not be to exact scale and may have been exaggerated for the benefit of effective explanation of the technical features associated with these elements. As such, the present disclosure shall not be restricted to the thicknesses, ratios, dimensions, or the like illustrated in the drawings. The term “and/or” shall include the combination of a plurality of listed items or any of the plurality of listed items that can be defined by relevant elements.

Terms such as, for example, first, second, and the like may be used to describe various components, but the components should not be limited by the terms. The terms as used herein may distinguish one component from other components and are not to be limited by the terms. For example, without departing the scope of the present disclosure, a first component may be referred to as a second component, and similarly, the second component may also be referred to as the first component. The terms of a singular form may include plural forms unless otherwise specified.

The terminology used herein is for the purpose of describing particular embodiments and is not intended to be limiting. As used herein, “a,” “an,” “the,” and “at least one” do not denote a limitation of quantity, and are intended to include both the singular and plural, unless the context clearly indicates otherwise. For example, “an element” has the same meaning as “at least one element,” unless the context clearly indicates otherwise. “At least one” is not to be construed as limiting “a” or “an.” “Or” means “and/or.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, or components.

The term “substantially,” as used herein, means approximately or actually. The term “substantially equal” means approximately or actually equal. The term “substantially the same” means approximately or actually the same. The term “substantially perpendicular” means approximately or actually perpendicular. The term “substantially parallel” means approximately or actually parallel.

The terms “high signal” (or alternatively, “high voltage level”) and “low signal” (or alternatively, “low voltage level”) are relative terms describing levels of voltages. For example, the terms “high signal” (or alternatively, “high voltage level”) and “low signal” (or alternatively, “low voltage level”) may refer to levels of voltages which, when applied to a transistor described herein, may activate a transistor (e.g., turn “ON” the transistor) or deactivate a transistor (e.g., turn “OFF” the transistor) based on transistor type (e.g., P-type, N-type, or the like).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the items, unless the relevant context clearly indicates otherwise. As used herein, each of such phrases as “A or B”, “at least one of A and B”, “at least one of A or B”, “A, B, or C”, “at least one of A, B, and C”, and “at least one of A, B, or C”, may include any one of, or all possible combinations of the items enumerated together in a corresponding one of the phrases.

An expression such as "comprising" or "including" is intended to designate a characteristic, a number, a step, an operation, an element, a part or combinations thereof, and shall not be construed to preclude any possibility of presence or addition of one or more other characteristics, numbers, steps, operations, elements, parts or combinations thereof.

FIG. 1 is an example block diagram illustrating a display module DM according to an embodiment of the present disclosure. Referring to FIG. 1, the display module DM may include a plurality of pixels PX1-PXn, a signal control circuit SCC, a gate driving circuit GDC, a light-emission control circuit ECC, and a data driving circuit DCC. In an embodiment, the display module DM may be a small-to medium-sized display device. For example, the small-to medium-sized display device may be any one of a tablet, a built-in display of a home appliance, a smartwatch, and a smartphone. In another embodiment, the display module DM may be a large-sized display device, which may be any one of a television, a monitor, and an electronic billboard.

Each of the plurality of pixels PX1-PXn may be configured to emit light. Specifically, the i−1-th pixel PXi-1, the i-th pixel PXi, and the i+1-th pixel PXi+1 may each be any one of the plurality of pixels PX1-PXn.

The signal control circuit SCC may be configured to control at least one of the gate driving circuit GDC, the data driving circuit DCC, and the light-emission control circuit ECC. The signal control circuit SCC may be configured to receive image data and control signals from an external graphics control unit (not illustrated). The control signals may include a vertical synchronization signal, a horizontal synchronization signal, a data enable signal, and a clock signal. The vertical synchronization signal may be a signal that distinguishes frame sections, while the horizontal synchronization signal may be a signal that distinguishes horizontal sections, i.e., a row-distinguishing signal.

In an embodiment, the signal control circuit SCC may be a timing controller. However, the signal control circuit SCC of the present disclosure is not limited thereto, and the signal control circuit SCC may be any circuit capable of controlling at least one of the gate driving circuit GDC, the data driving circuit DCC, and the light-emission control circuit ECC.

The gate driving circuit GDC may be configured to receive a control signal from the signal control circuit SCC and provide gate control signals GS to the plurality of pixels PX1-PXn.

In an embodiment, the gate driving circuit GDC may be formed simultaneously with the pixels PX through a thin-film process. For example, the gate driving circuit GDC may be implemented in the form of an oxide semiconductor TFT gate driver circuit (OSG) or an amorphous silicon TFT gate driver circuit (ASG).

The light-emission control circuit ECC may be configured to receive a control signal from the signal control circuit SCC and provide light-emission control signals EM to the plurality of pixels PX1-PXn.

The data driving circuit DCC may be configured to receive a control signal from the signal control circuit SCC and provide data signals DS to the plurality of pixels PX1-PXn.

The display module DM according to an embodiment of the present disclosure may further include an input sensing driving circuit (not illustrated). The input sensing driving circuit and the signal control circuit SCC may be mounted on a printed circuit board (PCB). The input sensing driving circuit may be configured to process signals corresponding to a user's touch input and signals corresponding to pressure applied from an external source. For example, the PCB may be a flexible printed circuit board (FPCB).

Figure 2A:
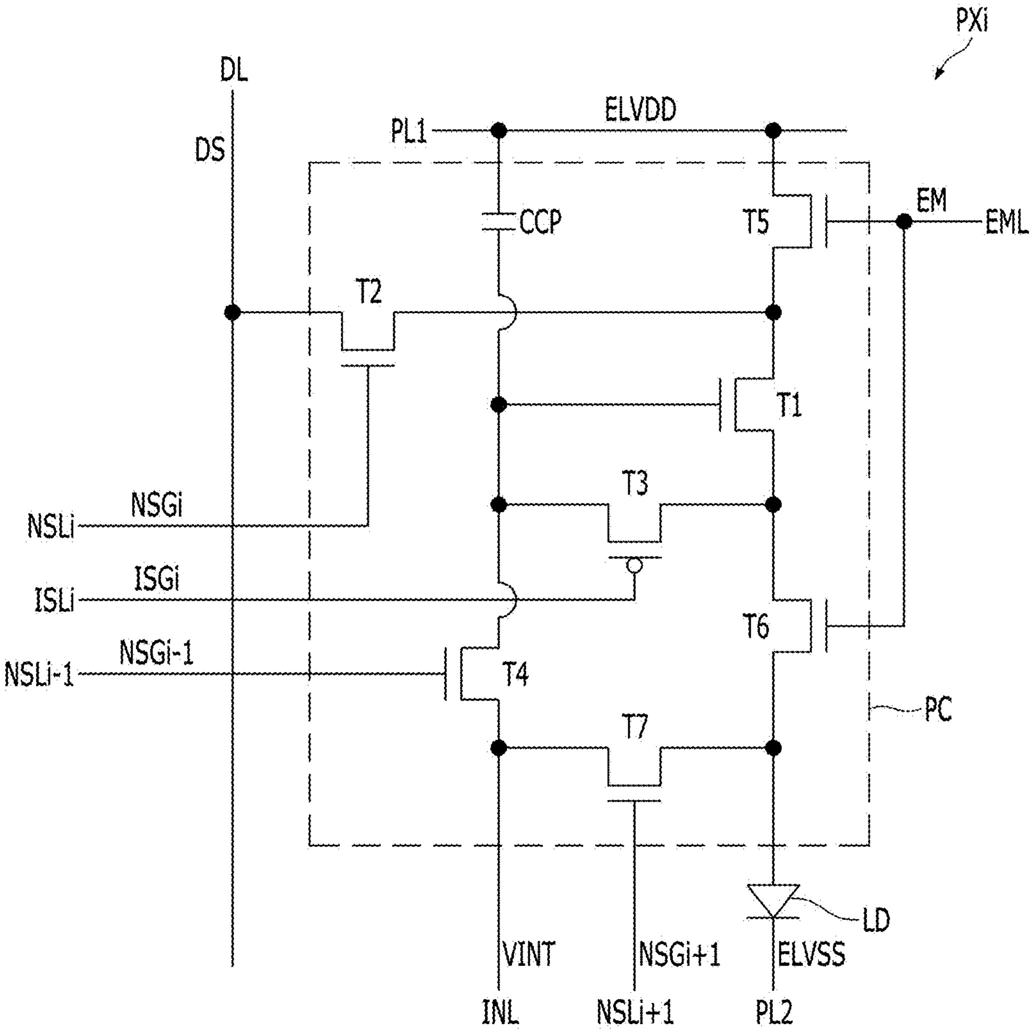
FIG. 2A is an example equivalent circuit diagram illustrating an i-th pixel according to an embodiment of the present disclosure.
Figure 2B:
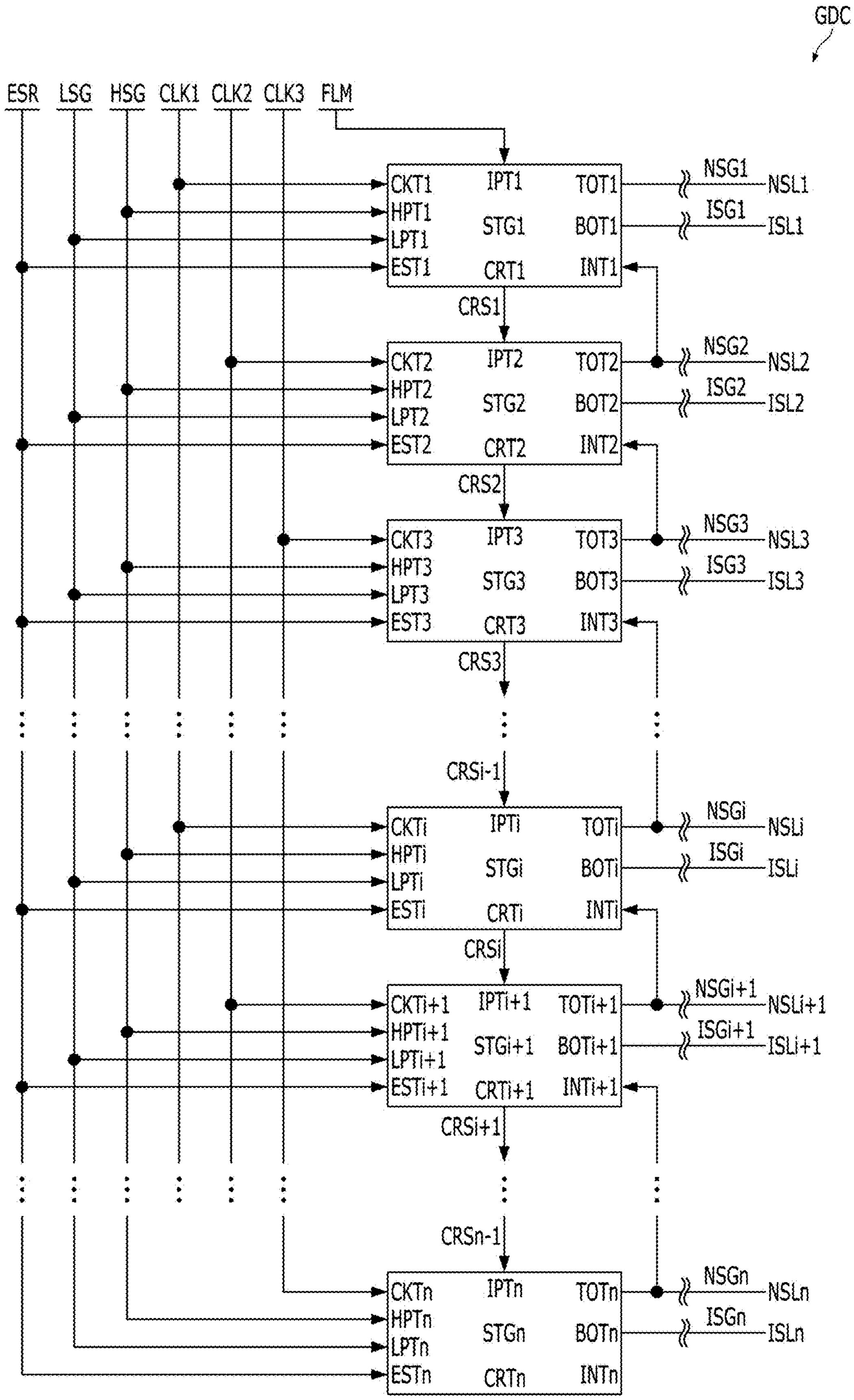
FIG. 2B is an example block diagram illustrating a gate driving circuit according to an embodiment of the present disclosure.

FIG. 2A is an example circuit diagram illustrating an equivalent circuit of an i-th pixel PXi according to an embodiment of the present disclosure. FIG. 2B is an example block diagram illustrating a gate driving circuit GDC according to an embodiment of the present disclosure.

Referring to FIGS. 1 and 2A, a gate control signal GS may include a plurality of non-inverted output signals NSG1-NSGn and a plurality of inverted output signals ISG1-ISGn.

Each of the plurality of pixels PX1-PXn may include a light-emitting diode LD and a pixel circuit PC. The structure of the pixel PX in the present disclosure is not limited to that illustrated in FIG. 2A. In other embodiments, the pixel PX may be implemented in various configurations to enable light emission by the light-emitting diode LD.

The pixel circuit PC may include a plurality of transistors T1-T7 and a compensation capacitor CCP. The pixel circuit PC may be configured to control the amount of current flowing through the light-emitting diode LD in response to a data signal DS. The pixel circuit PC may include at least one oxide thin-film transistor and/or a low-temperature polycrystalline silicon (LTPS) thin-film transistor.

The light-emitting diode LD may be configured to emit light at a predetermined luminance in response to the amount of current provided from the pixel circuit PC. To this end, the potential of a first power supply ELVDD may be set higher than the potential of a second power supply ELVSS. For example, the light-emitting diode LD may be an organic light-emitting diode (OLED).

The plurality of transistors T1-T7 may each include an input electrode (or source electrode), an output electrode (or drain electrode), and a control electrode (or gate electrode). In this specification, one of the input electrode and the output electrode may be referred to as a first electrode, while the other may be referred to as a second electrode.

The first electrode of the first transistor T1 may be electrically connected to the first power supply ELVDD via the fifth transistor T5, and the second electrode of the first transistor T1 may be electrically connected to an anode electrode of the light-emitting diode LD via the sixth transistor T6. The first transistor T1 may be configured to control the amount of current flowing through the light-emitting diode LD based on the potential of the control electrode.

The second transistor T2 may be disposed between a data line DL and the first electrode of the first transistor T1. The second transistor T2 may be electrically connected to an i-th non-inverted output line NSLi and may be turned on by an i-th non-inverted output signal NSGi to electrically connect the data line DL to the first electrode of the first transistor T1.

Although it is illustrated in FIG. 2A that the control electrode of the second transistor T2 is electrically connected to the i-th non-inverted output line NSLi, the present disclosure is not limited to this configuration. In an embodiment, for example, the control electrode of the second transistor T2 may be electrically connected to any one of the plurality of non-inverted output lines NSL1-NSLn or to any one of the plurality of inverted output lines ISL1-ISLn.

The third transistor T3 may be disposed between the second electrode of the first transistor T1 and the control electrode of the first transistor T1. The control electrode of the third transistor T3 may be electrically connected to an i-th inverted output line ISLi, and the first electrode of the third transistor T3 may be electrically connected with the control electrode of the first transistor T1. The third transistor T3 may be turned on by an i-th inverted output signal ISGi to electrically connect the second electrode of the first transistor T1 to the control electrode of the first transistor T1. Accordingly, when the third transistor T3 is turned on, the first transistor T1 may operate as a diode.

Although it is depicted in FIG. 2A that the control electrode of the third transistor T3 is electrically connected to the i-th inverted output line ISLi, the present disclosure is not limited to this configuration. In an embodiment, for example, the control electrode of the second transistor T2 may be electrically connected to any one of the plurality of non-inverted output lines NSLI-NSLn or to any one of the plurality of inverted output lines ISL1-ISLn.

The fourth transistor T4 may be disposed between the compensation capacitor CCP and an initialization power supply line INL. The control electrode of the fourth transistor T4 may be electrically connected to the i−1-th non-inverted output line NSLi−1. The fourth transistor T4 may be turned on by the i−1-th non-inverted output signal NSGi−1 to provide an initialization voltage VINT to the first electrode of the third transistor T3.

Although it is illustrated in FIG. 2A that the control electrode of the fourth transistor T4 is electrically connected to the i−1-th non-inverted output line NSLi−1, the present disclosure is not limited to this configuration. In an embodiment, for example, the control electrode of the fourth transistor T4 may be electrically connected to any one of the plurality of non-inverted output lines NSL1-NSLn or to any one of the plurality of inverted output lines ISL1-ISLn.

The fifth transistor T5 may be electrically connected between the first power supply line PL1 and the first electrode of the first transistor T1. The control electrode of the fifth transistor T5 may be electrically connected to a light-emission control line EML that provides a light-emission control signal EM.

The sixth transistor T6 may be connected between the second electrode of the first transistor T1 and the anode electrode of the light-emitting diode LD. The control electrode of the sixth transistor T6 may be electrically connected to the light-emission control line EML that provides the light-emission control signal EM.

The seventh transistor T7 may be disposed between the initialization power supply line INL and the anode electrode of the light-emitting diode LD. The control electrode of the seventh transistor T7 may be electrically connected to the i+1-th non-inverted output line NSLi+1 that provides the i+1-th non-inverted output signal NSGi+1. The seventh transistor T7 may be turned on by the i+1-th non-inverted output signal NSGi+1 to transfer the initialization voltage VINT to the anode electrode of the light-emitting diode LD.

The seventh transistor T7 may be configured to improve the black representation capability of the pixel PX. Specifically, when the seventh transistor T7 is turned on, a parasitic capacitor (not illustrated) of the light-emitting diode LD may be discharged. Accordingly, light emission by the light-emitting diode LD due to leakage current during black luminance implementation may be suppressed. Thus, the black representation capability of the display module DM may be enhanced.

Although it is illustrated in FIG. 2A that the control electrode of the seventh transistor T7 is electrically connected to the i+1-th non-inverted output line NSLi+1, the present disclosure is not limited to this configuration. In an embodiment, for example, the control electrode of the fourth transistor T4 may be electrically connected to any one of the plurality of non-inverted output lines NSL1-NSLn or to any one of the plurality of inverted output lines ISL1-ISLn.

The compensation capacitor CCP may be disposed between the first power supply line PL1 and the control electrode of the first transistor T1. The amount of current flowing through the first transistor T1 when the fifth transistor T5 and the sixth transistor T6 are turned on may be determined by the amount of charge stored in the compensation capacitor CCP.

In an embodiment, each of the first transistor T1, the second transistor T2, the third transistor T3, the fourth transistor T4, the fifth transistor T5, the sixth transistor T6, and the seventh transistor T7 may be an oxide thin-film transistor or a low-temperature polycrystalline silicon (LTPS) thin-film transistor.

Referring to FIG. 2B, the gate driving circuit GDC may include a plurality of stages STG1 STGn. The plurality of stages STG1-STGn may be sequentially connected with each other and electrically connected with the plurality of pixels PX1-PXn through a plurality of non-inverted output lines NSL1-NSLn and a plurality of inverted output lines ISL1-ISLn.

The plurality of stages STG1-STGn may be configured to receive a stage initialization signal ESR, a low signal LSG, a high signal HSG, a plurality of clock signals CLK1, CLK2, CLK3, and an initialization signal FLM. The stage initialization signal ESR, low signal LSG, high signal HSG, plurality of clock signals CLK1, CLK2, CLK3, and initialization signal FLM may be provided from the signal control circuit SCC. In another embodiment, at least some of the stage initialization signal ESR, low signal LSG, high signal HSG, plurality of clock signals CLK1, CLK2, CLK3, and initialization signal FLM may be omitted.

Each of the plurality of stages STG1-STGn may include an upper output terminal TOT, a carry terminal CRT, a low-potential terminal LPT, a clock terminal CKT, an input terminal IPT, a charging unit CHG, an inverting unit INV, a main boosting unit MBS, a main output unit MOP, a sub-output unit SOP, a main initialization unit MIN, and a sub-initialization unit SIN.

Figure 3A:
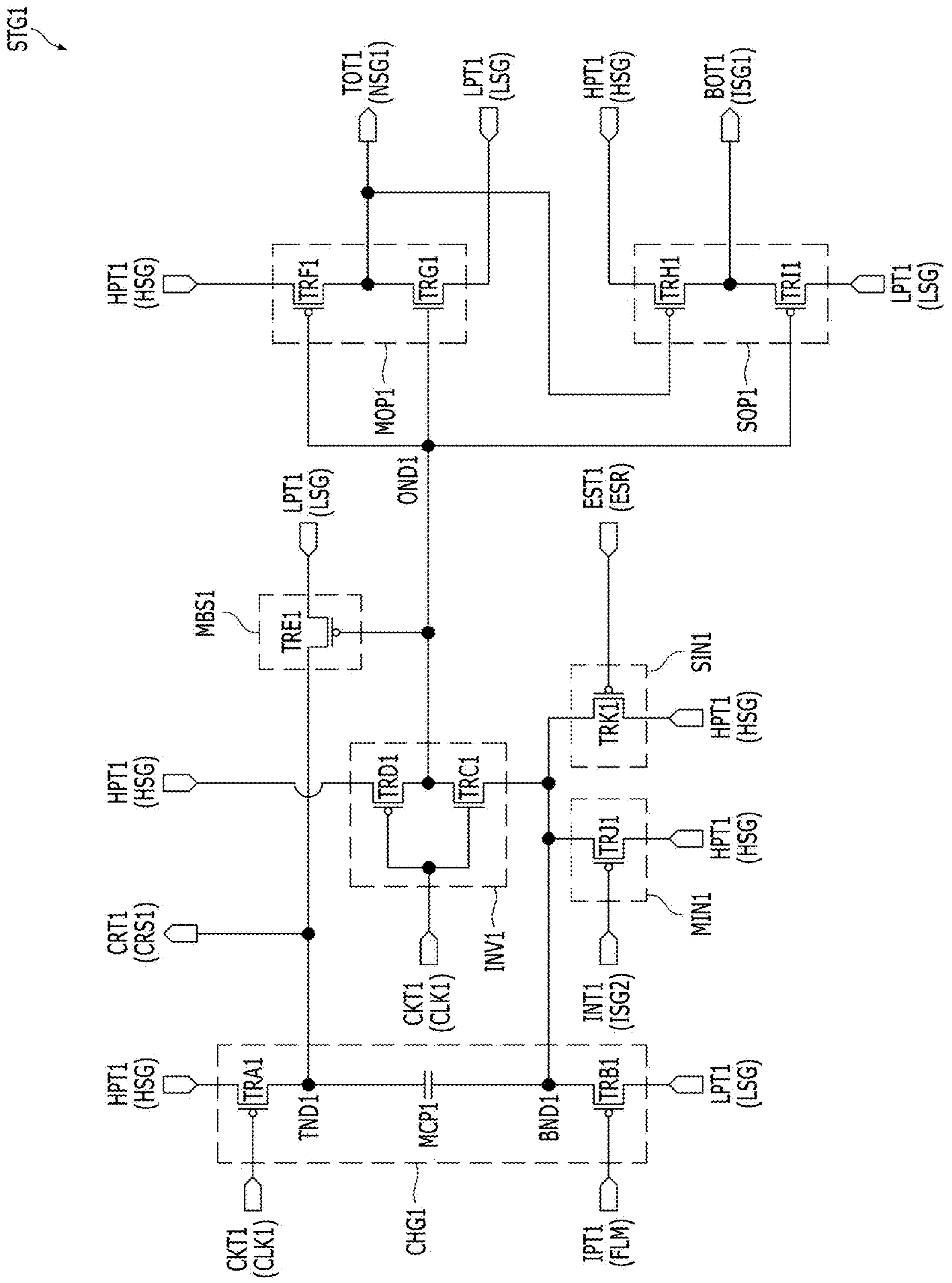
FIGS. 3A and 3B are example circuit diagrams illustrating a first stage and a second stage according to an embodiment of the present disclosure.
Figure 3B:
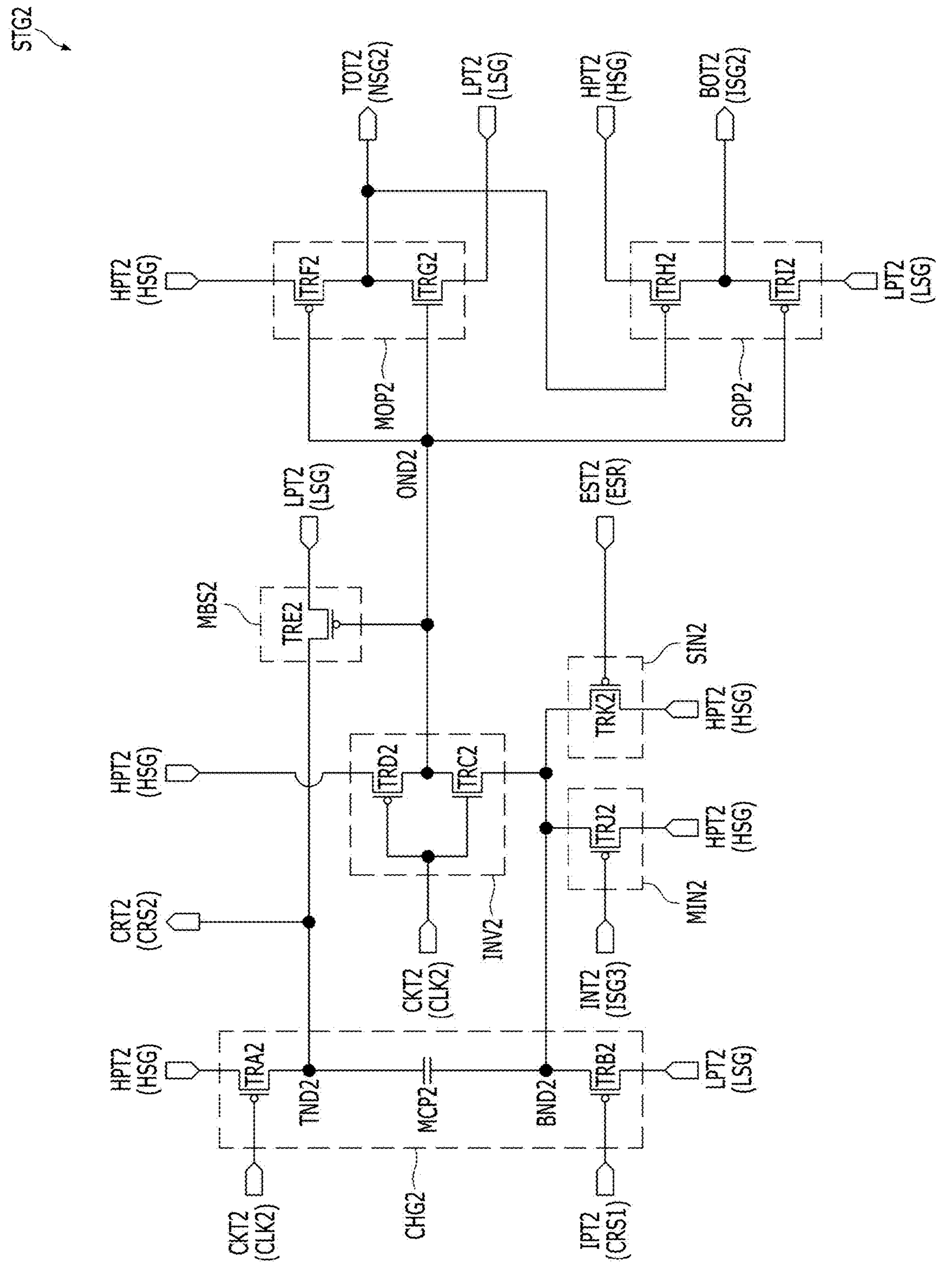
Figure 3C:
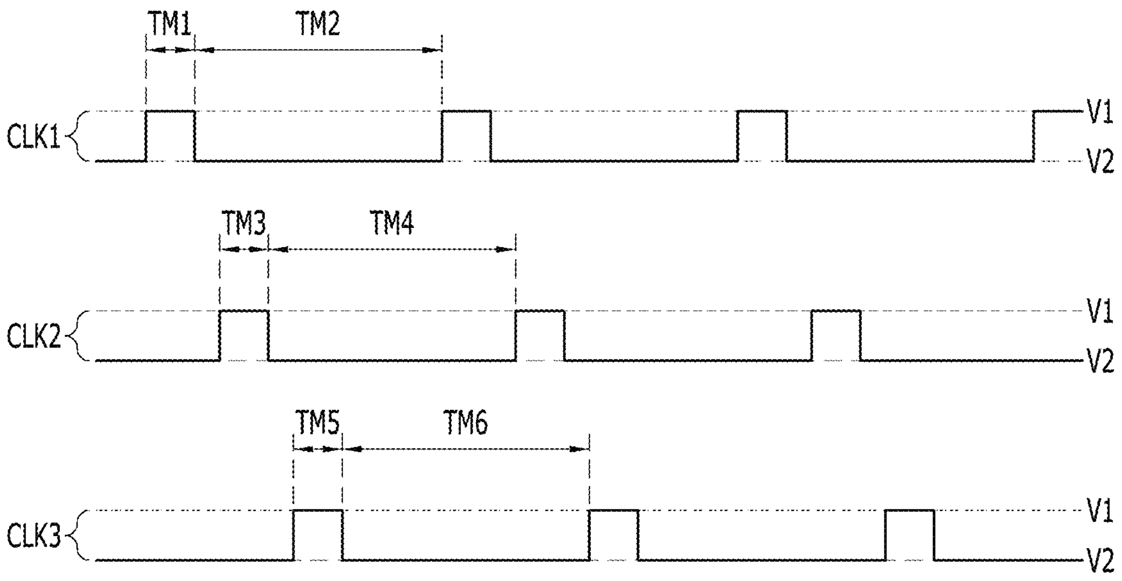
FIG. 3C is an example waveform diagram illustrating clock signals according to an embodiment of the present disclosure.

FIG. 3A is an example circuit diagram of a first stage STG1 according to an embodiment of the present disclosure. FIG. 3B is an example circuit diagram of a second stage STG2 according to an embodiment of the present disclosure. FIG. 3C is an example waveform diagram illustrating clock signals CLK1, CLK2, CLK3 according to an embodiment of the present disclosure.

Referring to FIG. 3A, among the plurality of stages STG1-STGn, the first stage STG1 may receive a high signal HSG, a low signal LSG, and a first clock signal CLK1. The first stage STG1 may include a first upper output terminal TOT1, a first lower output terminal BOT1, a first carry terminal CRT1, a first high-potential terminal HPT1, a first low-potential terminal LPT1, a first clock terminal CKT1, a first input terminal IPT1, a first main initialization terminal INT1, a first sub-initialization terminal EST1, a first charging unit CHG1, a first inverting unit INV1, a first main boosting unit MBS1, a first main output unit MOP1, a first sub-output unit SOP1, a first main initialization unit MIN1, and a first sub-initialization unit SIN1.

In an embodiment, at least some of the first upper output terminal TOT1, first lower output terminal BOT1, first carry terminal CRT1, first high-potential terminal HPT1, first low-potential terminal LPT1, first clock terminal CKT1, first input terminal IPT1, first main initialization terminal INT1, first sub-initialization terminal EST1, first charging unit CHG1, first inverting unit INV1, first main boosting unit MBS1, first main output unit MOP1, first sub-output unit SOP1, first main initialization unit MIN1, and first sub-initialization unit SIN1 may be omitted.

The first upper output terminal TOT1 may be configured to transfer a first non-inverted output signal NSG1 to at least one of the plurality of pixels PX1-PXn. In an embodiment, the second transistor T2 illustrated in FIG. 2A may be turned on or off by the first non-inverted output signal NSG1.

The first lower output terminal BOT1 may be configured to transfer a first inverted output signal ISG1 to at least one of the plurality of pixels PX1-PXn. In an embodiment, the third transistor T3 illustrated in FIG. 2A may be turned on or off by the first inverted output signal ISG1.

The first carry terminal CRT1 may be electrically connected to the first upper charging node TND1 and the second stage STG2 among the plurality of stages STG1-STGn. The potential of the first upper charging node TND1 may be transferred to a second input terminal IPT2 through the first carry terminal CRT1.

Referring to FIG. 3C, the first high-potential terminal HPT1 may be configured to receive the high signal HSG, which has a first potential V1, and the first low-potential terminal LPT1 may be configured to receive the low signal LSG, which has a second potential V2 lower than the first potential V1. In an embodiment, the first potential V1 may be between +4 V and +12 V, while the second potential V2 may be between −4 V and −12 V. In another embodiment, the first potential V1 and the second potential V2 may be adjusted as applicable or desired.

The first clock terminal CKT1 may be configured to receive the first clock signal CLK1.

The first input terminal IPT1 may be configured to receive the initialization signal FLM. In an embodiment, an input terminal IPTi of the i-th stage STGi may be configured to receive the initialization signal FLM or the i−1th carry signal CRSi−1. The i−1th carry signal CRSi−1 may be an electrical signal provided by the i−1th stage STGi−1 among the plurality of stages STG1-STGn. Specifically, the potential of the i−1th carry signal CRSi−1 may be equal to the potential of an upper charging node TNDi−1 of the i−1th stage STGi−1.

The first main initialization terminal INT1 may be electrically connected with one of a second upper output terminal TOT2 and a second lower output terminal BOT2.

The first sub-initialization terminal EST1 may be configured to receive the stage initialization signal ESR. The stage initialization signal ESR may be an electrical signal for initializing the plurality of stages STG1-STGn.

The first charging unit CHG1 may include a first upper input transistor TRA1, a first main capacitor MCP1, and a first lower input transistor TRB1. The first charging unit CHG1 may be controlled by one of the initialization signal FLM and the carry signal CRS as well as by the first clock signal CLK1 to charge the first main capacitor MCP1 with an amount of charge corresponding to the potential difference between the high signal HSG and the low signal LSG. The carry signal CRS may be an electrical signal received from a stage other than the first stage STG1 among the plurality of stages STG1-STGn.

The first upper input transistor TRA1 may be disposed between the first high-potential terminal HPT1 and the first upper charging node TND1. The first upper input transistor TRA1 may be configured to turn on or off in response to the first clock signal CLK1.

The first lower input transistor TRB1 may be disposed between the first lower charging node BND1, which is electrically insulated from the first upper charging node TND1, and the first low-potential terminal LPT1. The first lower input transistor TRB1 may be configured to turn on or off based on the potential of the first input terminal IPT1.

The first main capacitor MCP1 may be disposed between the first upper charging node TND1 and the first lower charging node BND1.

The first inverting unit INV1 may include a first lower inverting transistor TRC1 and a first upper inverting transistor TRD1. The first inverting unit INV1 may be controlled by the first clock signal CLK1 to either transfer the high signal HSG to the first output node OND1 or electrically connect the first lower charging node BND1 to the first output node OND1.

The first lower inverting transistor TRC1 may be disposed between the first lower charging node BND1 and the first output node OND1. The first lower inverting transistor TRC1 may be configured to turn on or off based on the potential of the first clock terminal CKT1.

The first upper inverting transistor TRD1 may be disposed between the first lower inverting transistor TRC1 and the first high-potential terminal HPT1. The first upper inverting transistor TRD1 may be configured to turn on or off based on the potential of the first clock terminal CKT1.

The first main boosting unit MBS1 may include a first main boosting transistor TRE1. The first main boosting unit MBS1 may be configured to transfer the low signal LSG to the first upper charging node TND1 according to the potential of the first output node OND1.

The first main boosting transistor TRE1 may be disposed between the first low-potential terminal LPT1 and the first upper charging node TND1. The first main boosting transistor TRE1 may be configured to turn on or off based on the potential of the first output node OND1.

The first main output unit MOP1 may be configured to provide the first non-inverted output signal NSG1 to at least one of the plurality of pixels PX1-PXn based on the potential of the first output node OND1. The first main output unit MOP1 may include a first upper main output transistor TRF1 and a first lower main output transistor TRG1.

The first upper main output transistor TRF1 may be disposed between the first high-potential terminal HPT1 and the first upper output terminal TOT1. The first upper main output transistor TRF1 may be configured to turn on or off based on the potential of the first output node OND1.

The first lower main output transistor TRG1 may be disposed between the first low-potential terminal LPT1 and the first upper output terminal TOT1. The first lower main output transistor TRG1 may be configured to turn on or off based on the potential of the first output node OND1. In an embodiment, the first lower main output transistor TRG1 may be an N-type metal-oxide-semiconductor (NMOS) transistor (e.g., an N-channel MOSFET).

In an embodiment of the present disclosure, the first upper main output transistor TRF1 and the first lower main output transistor TRG1 may be controlled such that one is turned on while the other is turned off according to the potential of the first output node OND1.

In an embodiment, one of the first upper main output transistor TRF1 and the first lower main output transistor TRG1 may be an NMOS transistor (N-channel MOSFET), while the other may be a P-type metal-oxide-semiconductor (PMOS) transistor (e.g., a P-channel MOSFET).

The first sub-output unit SOP1 may be configured to provide a first inverted output signal ISG1 to at least one of the plurality of pixels PX1-PXn according to the potential of the first output node OND1 and the potential of the first non-inverted output signal NSG1. The first sub-output unit SOP1 may include a first upper sub-output transistor TRH1 and a first lower sub-output transistor TRI1.

The first upper sub-output transistor TRH1 may be disposed between the first high-potential terminal HPT1 and the first lower output terminal BOT1. The first upper sub-output transistor TRH1 may be configured to provide the high signal HSG as the first inverted output signal ISG1 based on the potential of the first non-inverted output signal NSG1.

The first lower sub-output transistor TRI1 may be disposed between the first low-potential terminal LPT1 and the first lower output terminal BOT1. The first lower sub-output transistor TRI1 may be configured to provide the low signal LSG as the first inverted output signal ISG1 based on the potential of the first output node OND1.

In an embodiment, one of the first non-inverted output signal NSG1 and the first inverted output signal ISG1 may be the high signal HSG, and the other of the first non-inverted output signal NSG1 and the first inverted output signal ISG1 may be the low signal LSG.

The first main initialization unit MIN1 and the first sub-initialization unit SIN1 may be configured for discharging the first main capacitor MCP1. That is, the first main initialization unit MIN1 and the first sub-initialization unit SIN1 may be configured to initialize the first stage STG1 to prevent malfunction.

The first main initialization unit MIN1 may include a first main initialization transistor TRJ1. The first main initialization unit MIN1 may be configured to provide the high signal HSG to the first lower charging node BND1 in response to one of a second non-inverted output signal NSG2 and a second inverted output signal ISG2.

The first main initialization transistor TRJ1 may be disposed between the first lower charging node BND1 and the first high-potential terminal HPT1. The first main initialization transistor TRJ1 may be configured to turn on or off based on the potential of the first main initialization terminal INT1.

The first sub-initialization unit SIN1 may be configured to transfer the high signal HSG to the first lower charging node BND1 in response to the stage initialization signal ESR. The first sub-initialization unit SIN1 may include a first sub-initialization transistor TRK1.

The first sub-initialization transistor TRK1 may be configured to turn on or off based on the potential of the first sub-initialization terminal EST1 and may be disposed between the first lower charging node BND1 and the first high-potential terminal HPT1.

Each of the first upper input transistor TRA1, first lower input transistor TRB1, first lower inverting transistor TRC1, first upper inverting transistor TRD1, first main boosting transistor TRE1, first upper main output transistor TRF1, first lower main output transistor TRG1, first upper sub-output transistor TRH1, first lower sub-output transistor TRI1, first main initialization transistor TRJ1, and first sub-initialization transistor TRK1 may be a PMOS transistor (P-channel MOSFET) or an NMOS transistor (N-channel MOSFET).

In an embodiment of the present disclosure, the first upper input transistor TRA1, first lower input transistor TRB1, first upper inverting transistor TRD1, first main boosting transistor TRE1, first upper main output transistor TRF1, first upper sub-output transistor TRH1, first lower sub-output transistor TRI1, first main initialization transistor TRJ1, and first sub-initialization transistor TRK1 may be a PMOS transistor (P-channel MOSFET), while the first lower inverting transistor TRC1 and first lower main output transistor TRG1 may be an NMOS transistor (N-channel MOSFET).

Referring to FIG. 3B, the second stage STG2, among the plurality of stages STG1-STGn, may be configured to receive a high signal HSG, a low signal LSG, and a second clock signal CLK2.

The second stage STG2 may include a second upper output terminal TOT2, a second lower output terminal BOT2, a second carry terminal CRT2, a second high-potential terminal HPT2, a second low-potential terminal LPT2, a second clock terminal CKT2, a second input terminal IPT2, a second main initialization terminal INT2, a second sub-initialization terminal EST2, a second charging unit CHG2, a second inverting unit INV2, a second main boosting unit MBS2, a second main output unit MOP2, a second sub-output unit SOP2, a second main initialization unit MIN2, and a second sub-initialization unit SIN2.

The second upper output terminal TOT2 may be configured to transfer the second non-inverted output signal NSG2 to at least one of the plurality of pixels PX1-PXn. The second lower output terminal BOT2 may be configured to provide the second inverted output signal ISG2 to at least one of the plurality of pixels PX1-PXn.

The second high-potential terminal HPT2 may be configured to receive the high signal HSG. The second low-potential terminal LPT2 may be configured to receive the low signal LSG. The second clock terminal CKT2 may be configured to receive the second clock signal CLK2. The second input terminal IPT2 may be electrically connected with the first carry terminal CRT1 of the first stage STG1.

The second charging unit CHG2 may include a second upper input transistor TRA2, a second main capacitor MCP2, and a second lower input transistor TRB2. The second inverting unit INV2 may include a second lower inverting transistor TRC2 and a second upper inverting transistor TRD2. The second main boosting unit MBS2 may include a second main boosting transistor TRE2. The second main output unit MOP2 may include a second upper main output transistor TRF2 and a second lower main output transistor TRG2. The second sub-output unit SOP2 may include a second upper sub-output transistor TRH2 and a second lower sub-output transistor TRI2. Other descriptions of the second stage STG2 are substantially identical to those described with respect to FIG. 3A and are thus omitted.

Referring to FIG. 3C, in an embodiment of the present disclosure, each of the first clock signal CLK1, the second clock signal CLK2, and the third clock signal CLK3 may be an electrical signal which swings between the first potential V1 and the second potential V2. In an embodiment, the first clock signal CLK1, the second clock signal CLK2, and the third clock signal CLK3 may have different phases with respect to one another. Expressed another way, the first clock signal CLK1, the second clock signal CLK2, and the third clock signal CLK3 may be different in phase compared to one another.

Figure 4:
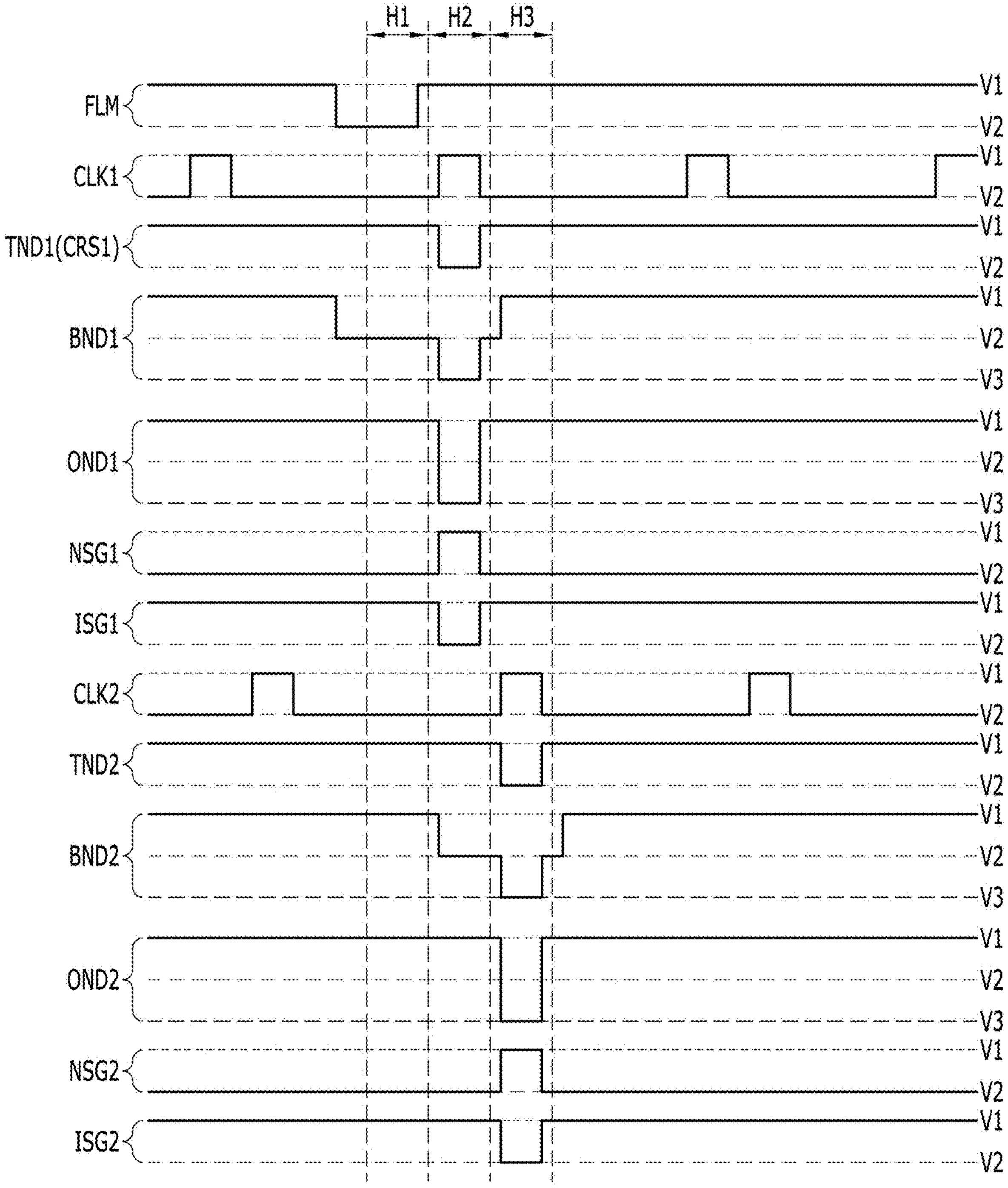
FIG. 4 is an example timing diagram illustrating the operation of the first stage and the second stage according to an embodiment of the present disclosure.

FIG. 4 is an example timing diagram illustrating the operation of the first stage STG1 and the second stage STG2. A duration TM1 for which the potential of the first clock signal CLK1 is maintained at the first potential V1 may be shorter than a duration TM2 for which the potential of the first clock signal CLK1 is maintained at the second potential V2. A duration TM3 for which the potential of the second clock signal CLK2 is maintained at the first potential V1 may be shorter than a duration TM4 for which the potential of the second clock signal CLK2 is maintained at the second potential V2. A duration TM5 for which the potential of the third clock signal CLK3 is maintained at the first potential V1 may be shorter than a duration TM6 for which the potential of the first clock signal CLK1 is maintained at the second potential V2.

Figure 5A:
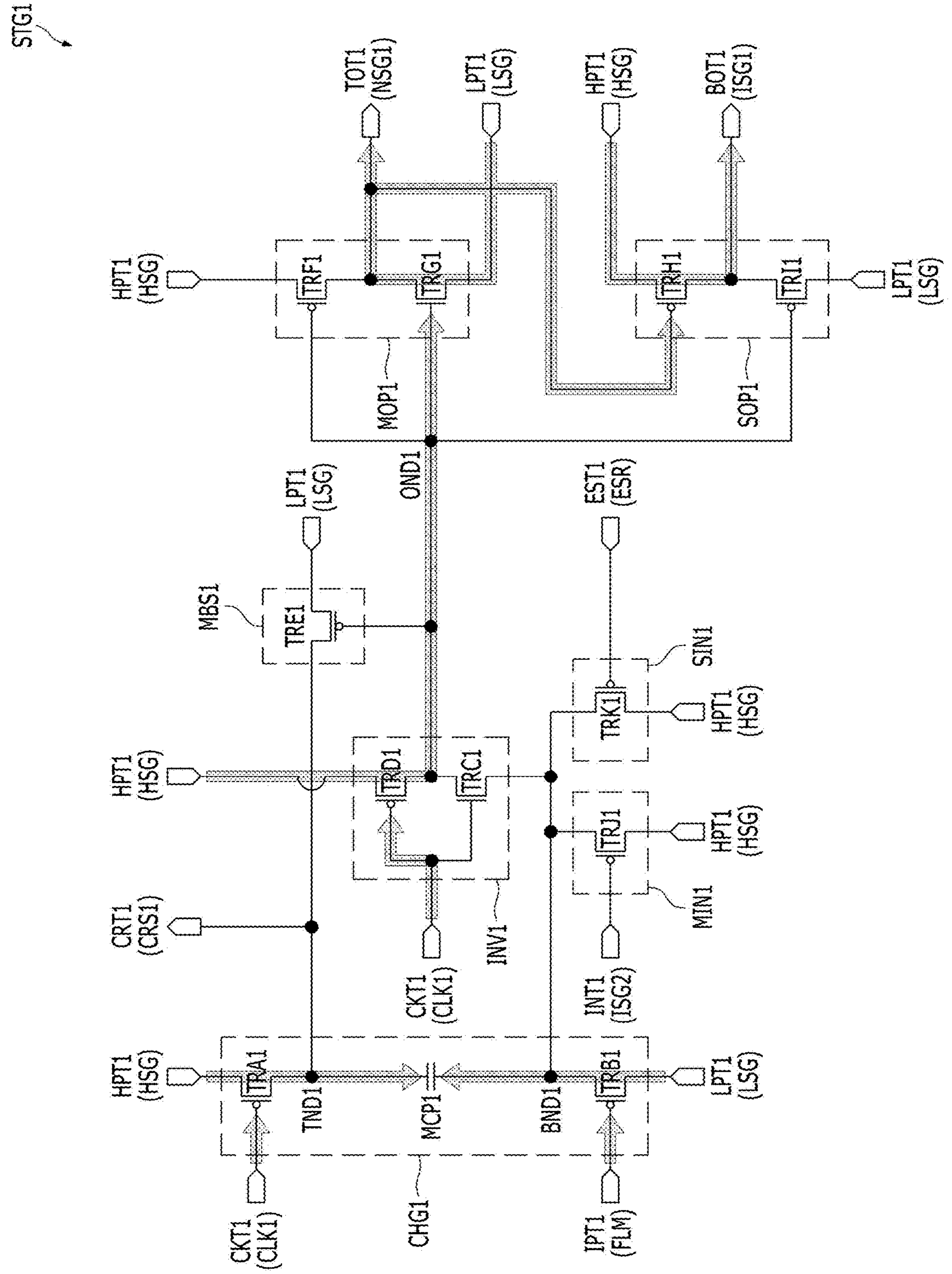
FIGS. 5A to 5C are example circuit diagrams illustrating the operation of the first stage according to an embodiment of the present disclosure.
Figure 5B:
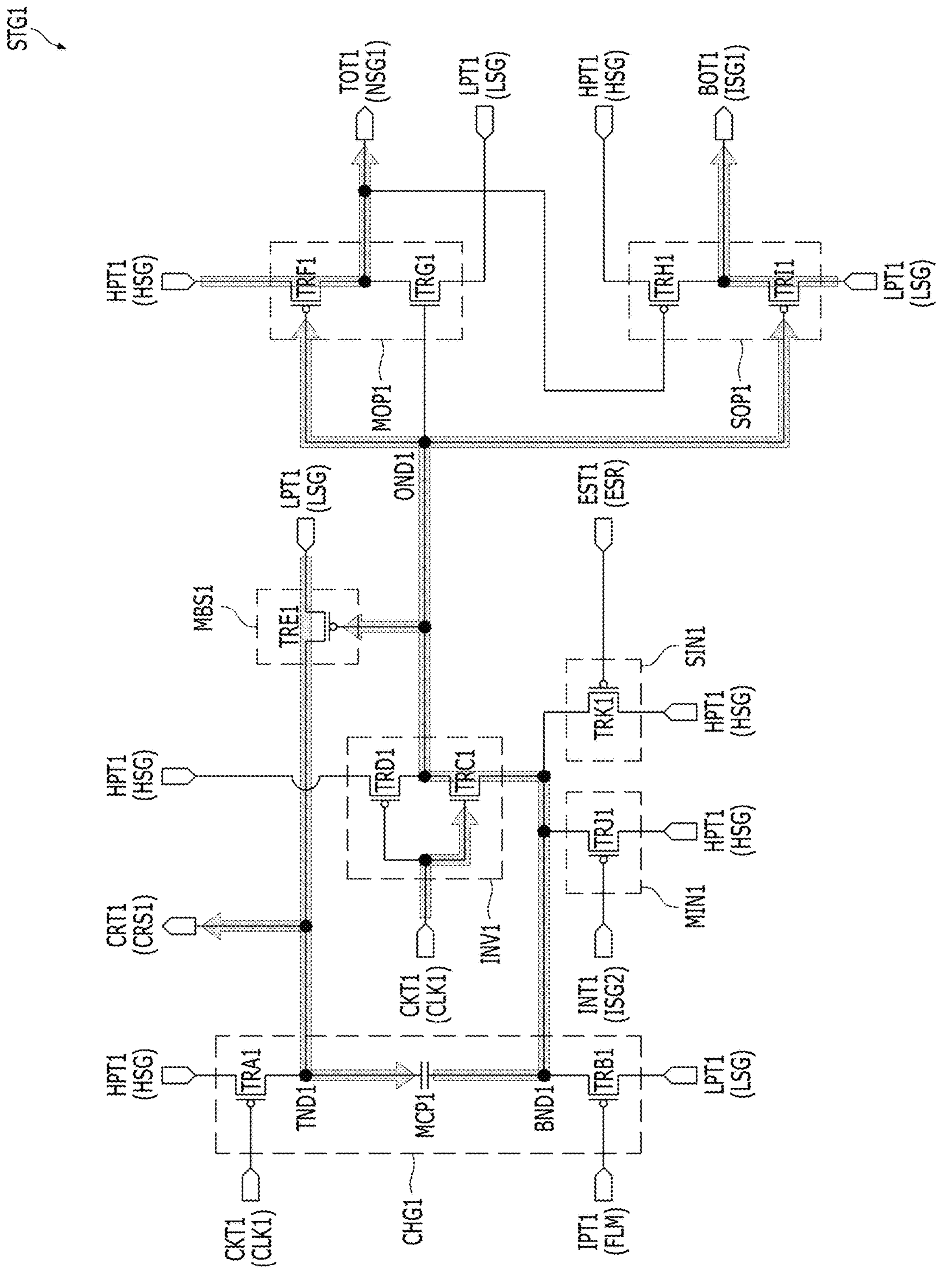
Figure 5C:
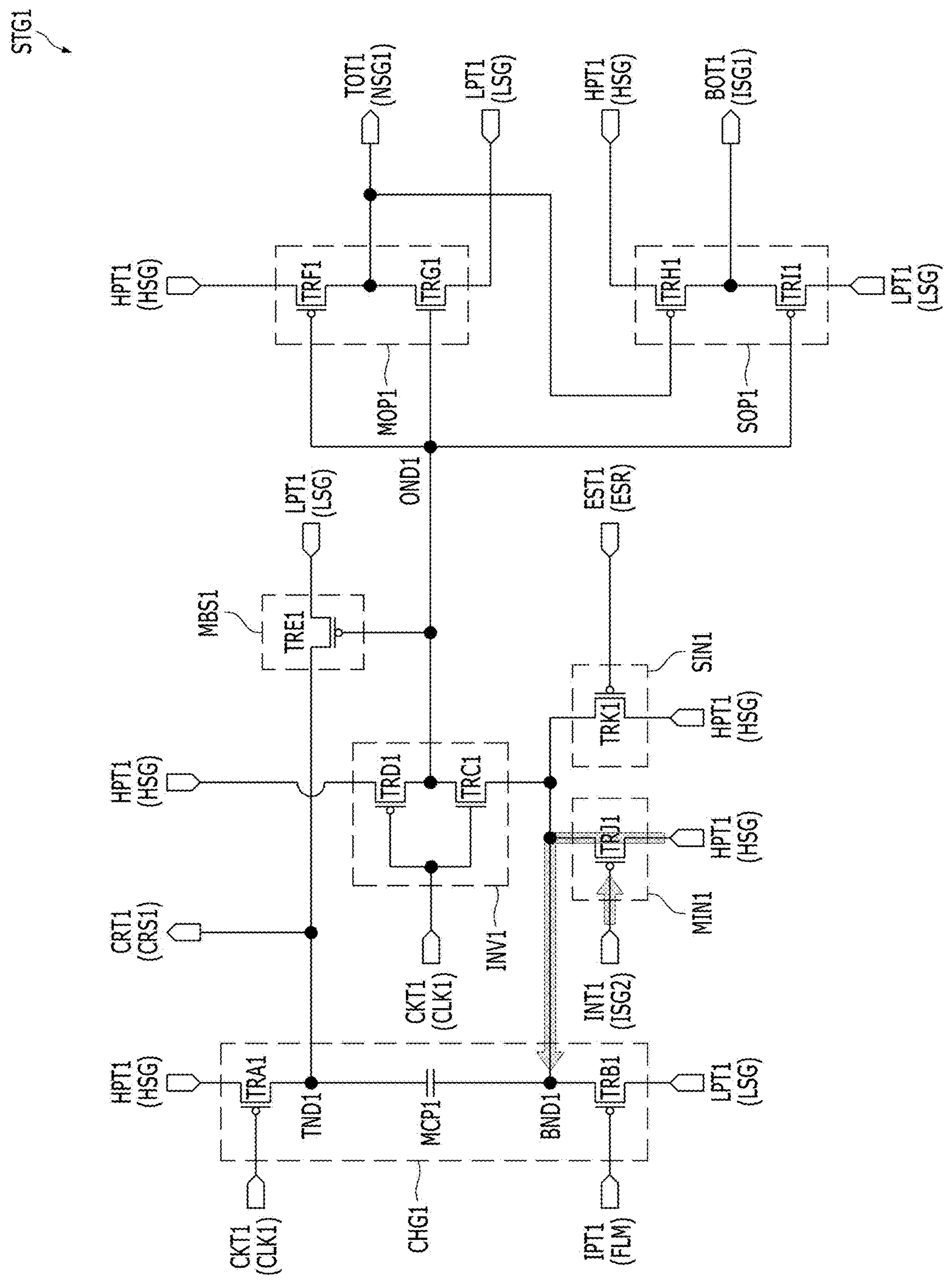

FIGS. 5A to 5C are example circuit diagrams illustrating the operation of the first stage STG1. In a first horizontal period H1 (see FIG. 4), the first main capacitor MCP1 may be charged. Hereinafter, the operation of the first stage STG1 in the first horizontal period H1 is described with reference to FIGS. 4 and 5A.

The first clock terminal CKT1 receives the first clock signal CLK1, and the first input terminal IPT1 receives the start signal FLM. When both the first clock signal CLK1 and the start signal FLM have the second potential V2 in the first horizontal period H1, the first upper input transistor TRA1 turns on, thereby transferring the high signal HSG to the first upper charging node TND1, and the first lower input transistor TRB1 turns on, thereby transferring the low signal LSG to the first lower charging node BND1. Accordingly, a charge amount corresponding to the potential difference between the high signal HSG and the low signal LSG is charged in the first main capacitor MCP1. That is, as a voltage corresponding to the difference between the first potential V1 and the second potential V2 (i.e., V1-V2) is applied to the first main capacitor MCP1, the first main capacitor MCP1 is charged.

The first upper inverting transistor TRD1 turns on in response to the first clock signal CLK1 and transfers the high signal HSG to the first output node OND1, and the first output node OND1 may have the first potential V1. Due to the potential of the first output node OND1, each of the first lower main output transistor TRG1 and the first upper sub-output transistor TRH1 turns on.

Accordingly, the first stage STG1 provides the low signal LSG as the first non-inverted output signal NSG1 to at least one of the plurality of pixels PX1-PXn through the first upper output terminal TOT1. Moreover, the first stage STG1 provides the high signal HSG as the first inverted output signal ISG1 to at least one of the plurality of pixels PX1-PXn through the first lower output terminal BOT1.

In a second horizontal period H2 (see FIG. 4), the potential of the first output node OND1 may change from the first potential V1 to a third potential V3 due to the voltage applied to the first main capacitor MCP1. Hereinafter, the operations of the first stage STG1 and the second stage STG2 in the second horizontal period H2 are described with reference to FIGS. 4 and 5B.

When both the first clock signal CLK1 and the start signal FLM have the first potential V1 in the second horizontal period H2, the first upper input transistor TRA1 and the first lower input transistor TRB1 turn off, and the first lower inverting transistor TRC1 turns on. Since the first lower inverting transistor TRC1 turns on to electrically connect the first lower charging node BND1 to the first output node OND1, the potential of the first lower charging node BND1 is transferred to the first output node OND1. As a result, the potential of the first output node OND1 changes to the second potential V2.

Subsequently, once the first main boosting transistor TRE1 turns on based on the potential of the first output node OND1, the low signal LSG is transferred to the first upper charging node TND1, changing the potential of the first upper charging node TND1 from the first potential V1 to the second potential V2 and changing the potentials of the first lower charging node BND1 and the first output node OND1 change to the third potential V3.

The third potential V3 is equal to the second potential V2 minus the difference between the first potential V1 and the second potential V2. Thus, the third potential V3 may be expressed as 2*V2-V1. In an embodiment, the first potential V1 may be between +4 V and +12 V, the second potential V2 may be between −4 V and −12 V, and the third potential V3 may be between −36 V and −12 V.

Each of the first upper main output transistor TRF1 and the first lower sub-output transistor TRI1 turns on based on the potential of the first output node OND1. The first output node OND1 has the third potential V3, of which the absolute value is greater than those of the first potential V1 and the second potential V2.

Therefore, when the third potential V3 is applied to the first output node OND1, the first upper main output transistor TRF1 and the first lower sub-output transistor TRI1 may turn on more quickly than when the first potential V1 or the second potential V2 is applied to the first output node OND1. That is, with the present disclosure, since the electrical signal for turning on the first upper main output transistor TRF1 and the first lower sub-output transistor TRI1 is amplified, the operation speed of the gate driving circuit GDC may be improved.

The first stage STG1 provides the first non-inverted output signal NSG1 to at least one of the plurality of pixels PX1-PXn through the first upper output terminal TOT1 and provides the first inverted output signal ISG1 to at least one of the plurality of pixels PX1-PXn through the first lower output terminal BOT1.

Furthermore, the low signal LSG is transferred as the first carry signal CRS1 to the second input terminal IPT2 of the second stage STG2 through the first carry terminal CRT1, resulting in charging the second main capacitor MCP2 of the second stage STG2. The charging process of the second main capacitor MCP2 of the second stage STG2 in the second horizontal period H2 is substantially the same as the charging process of the first main capacitor MCP1 in the first horizontal period H1, so the detailed description thereof will be omitted.

One of the first non-inverted output signal NSG1 and the first inverted output signal ISG1 may be the high signal HSG, and the other may be the low signal LSG. That is, the first inverted output signal ISG1 may be an electrical signal that is the inversion of the first non-inverted output signal NSG1. Therefore, with the present disclosure, a gate driving circuit GDC capable of simultaneously outputting an inverted electrical signal (inverted signal, hereinafter) and a non-inverted electrical signal (non-inverted signal, hereinafter) can be provided. In the present specification, one of the non-inverted output signal NSG and the inverted output signal ISG may be an inverted signal, while the other may be a non-inverted signal.

In a third horizontal period H3 (see FIG. 4), the second main capacitor MCP2 of the second stage STG2 may be charged, and the first main capacitor MCP1 of the first stage STG1 may be discharged. That is, while the second stage STG2 is operating, the first stage STG1 may be initialized. Hereinafter, the operations of the first stage STG1 and the second stage STG2 in the third horizontal period H3 are described with reference to FIGS. 4 and 5C.

The process of the second stage STG2 providing the second non-inverted output signal NSG2 and the second inverted output signal ISG2 in the third horizontal period H3 is substantially the same as the process of the first stage STG1 providing the first non-inverted output signal NSG1 and the first inverted output signal ISG1 in the second horizontal period H2, and thus the detailed description thereof will be omitted.

The first main initialization terminal INT1 receives the second inverted output signal ISG2 of the second stage STG2. The first main initialization transistor TRJ1 turns on based on the potential of the first main initialization terminal INT1, and the first upper input transistor TRA1 turns on based on the potential of the first clock signal CLK1. As a result, the potentials of the first upper charging node TND1 and the first lower charging node BND1 change to the first potential V1, and the first main capacitor MCP1 is discharged. That is, the first stage STG1 may be initialized by the second stage STG2.

The first upper inverting transistor TRD1 turns on in response to the first clock signal CLK1 and transfers the high signal HSG to the first output node OND1, and the first output node OND1 may have the first potential V1. Based on the potential of the first output node OND1, each of the first lower main output transistor TRG1 and the first upper sub-output transistor TRH1 turns on.

Accordingly, the first stage STG1 provides the low signal LSG as the first non-inverted output signal NSG1 to at least one of the plurality of pixels PX1-PXn through the first upper output terminal TOT1. Moreover, the first stage STG1 provides the high signal HSG as the first inverted output signal ISG1 to at least one of the plurality of pixels PX1-PXn through the first lower output terminal BOT1.

Although it is illustrated in FIGS. 3A, 5A, 5B, and 5C that the first main initialization terminal INT1 receives the second inverted output signal ISG2, this is an example, and embodiments of the present disclosure are not limited thereto. In another embodiment, the first main initialization terminal INT1 may receive the second non-inverted output signal NSG2.

In conventional technology, some of the clock signals are used as output signals of the gate driving circuit, whereas, in the present disclosure, instead of the clock signal CLK, the high signal HSG and the low signal LSG are used as output signals of the gate driving circuit GDC, and the clock signal CLK is used in a limited manner only to control the gate driving circuit GDC. Accordingly, the clock signal CLK of the present disclosure may have a smaller amplitude or a shorter duration than the clock signal of conventional technology. Therefore, with the present disclosure, the power required for generating the clock signal CLK may be reduced, and the gate control signal GS may be stably provided regardless of the resistance of the wiring used for supplying the clock signal CLK.

Figure 6A:
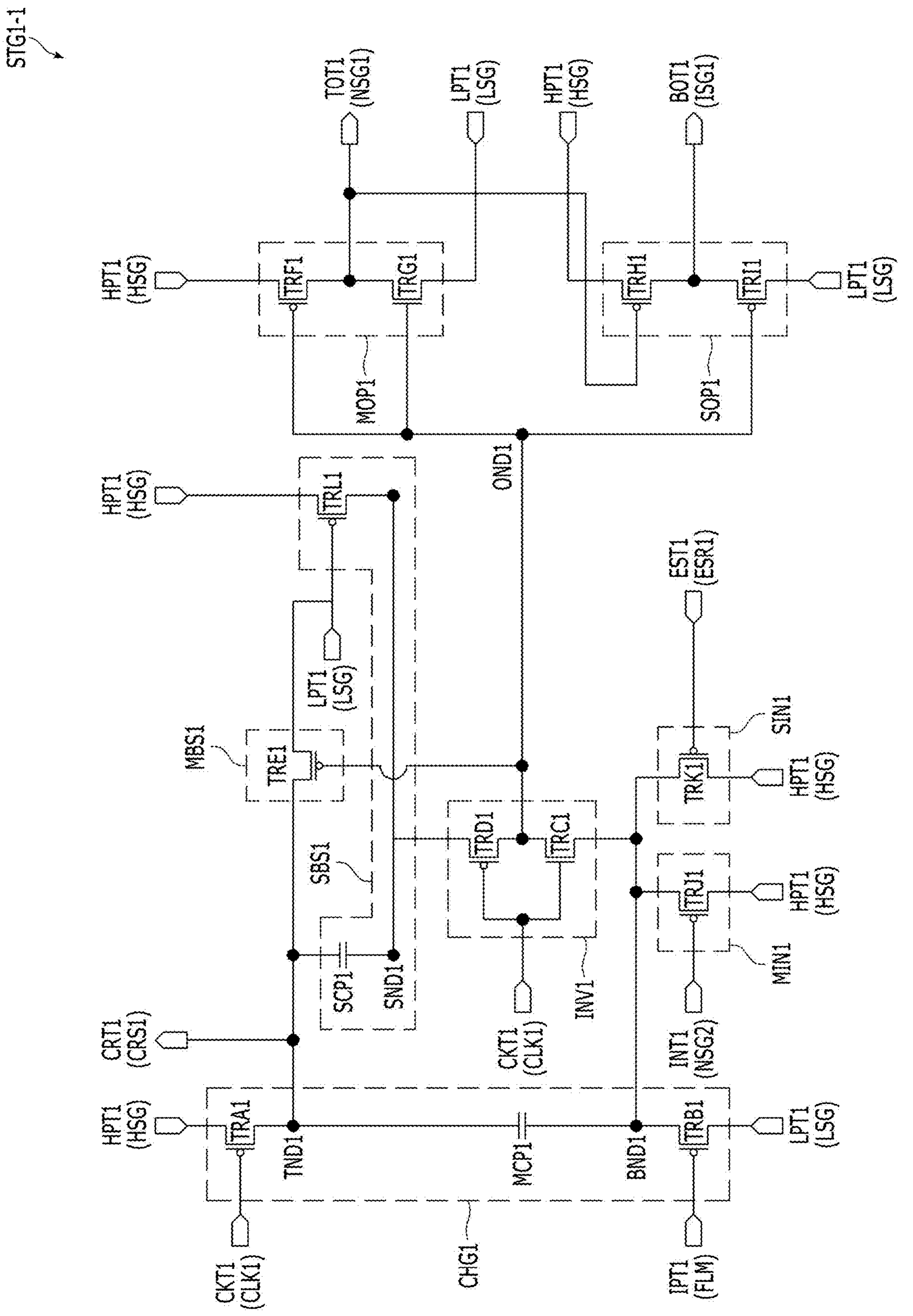
FIGS. 6A and 6B are example circuit diagrams illustrating the first stage and the second stage according to an embodiment of the present disclosure.
Figure 6B:
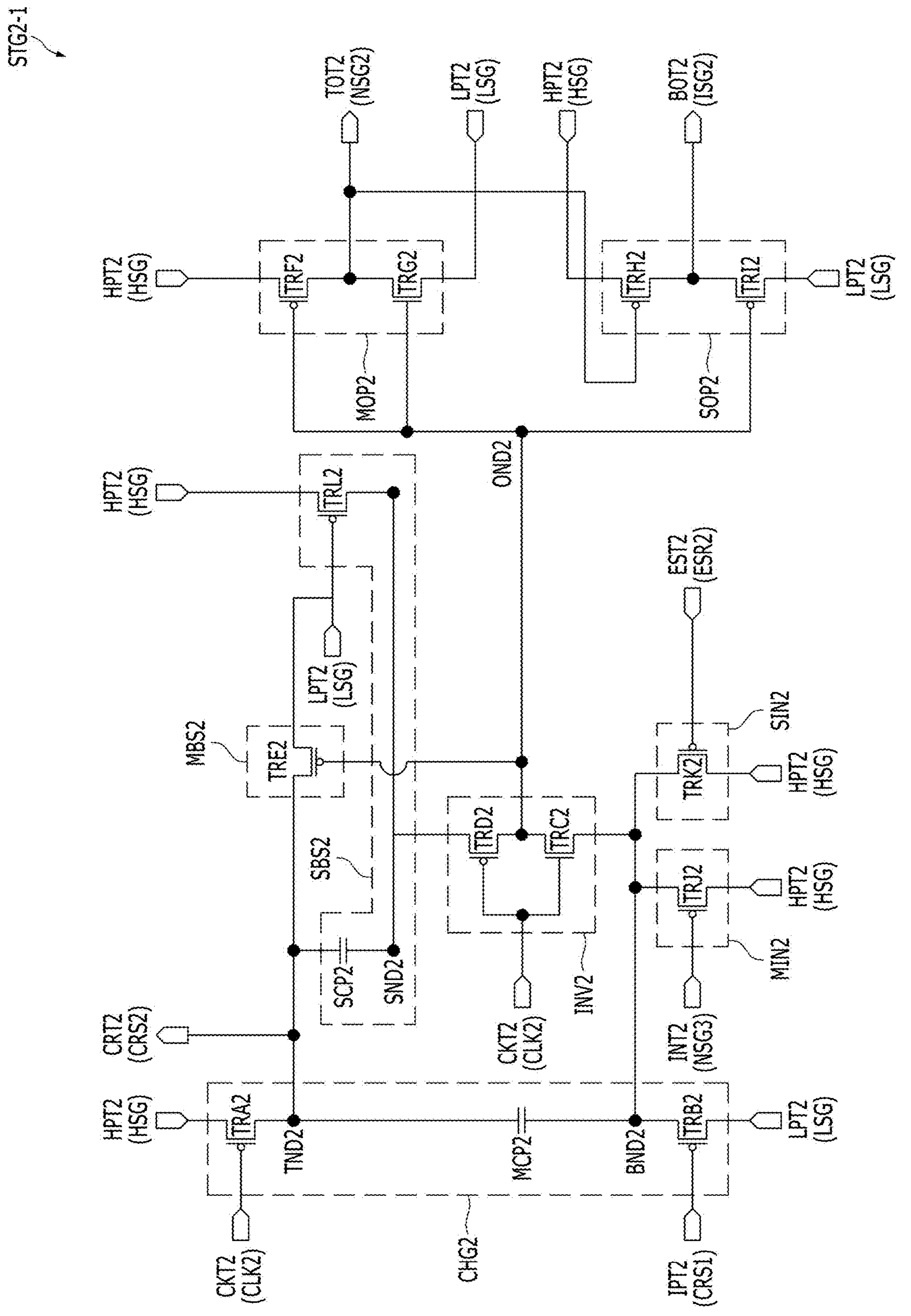

FIGS. 6A and 6B are example circuit diagrams illustrating a first stage STG1-1 and a second stage STG2-1 according to an embodiment of the present disclosure.

The first stage STG1-1 of FIG. 6A may further include a first sub-boosting unit SBS1, which is not present in the first stage STG1 of FIG. 3A. Referring to FIG. 6A, the first sub-boosting unit SBS1 may include a first sub-capacitor SCP1 and a first sub-boosting transistor TRL1.

The first sub-capacitor SCP1 may be configured to amplify an electrical signal for turning off the first upper main output transistor TRF1 and the first lower sub-output transistor TRI1. This will be described later in detail with reference to FIG. 7.

The first sub-capacitor SCP1 may be electrically connected with the first sub-boosting node SND1 and the first inverting unit INV1. The first sub-capacitor SCP1 may be disposed between the first upper charging node TND1 and the first sub-boosting node SND1. Depending on the first clock signal CLK1, the first sub-capacitor SCP1 may be charged or may be electrically connected to the first output node OND1.

The first sub-boosting transistor TRL1 may be disposed between the first high-potential terminal HPT1 and the first sub-boosting node SND1. The first sub-boosting transistor TRL1 may be configured to turn on based on the potential of the first low-potential terminal LPT1 to electrically connect the first high-potential terminal HPT1 to the first sub-boosting node SND1.

The second stage STG2-1 of FIG. 6B may further include a second sub-boosting unit SBS2, which is not present in the second stage STG2 of FIG. 3B. Referring to FIG. 6B, the second sub-boosting unit SBS2 may include a second sub-capacitor SCP2 and a second sub-boosting transistor TRL2. Other descriptions of the second sub-boosting unit SBS2 are substantially the same as those described with reference to FIG. 6A and thus are omitted.

Figure 7:
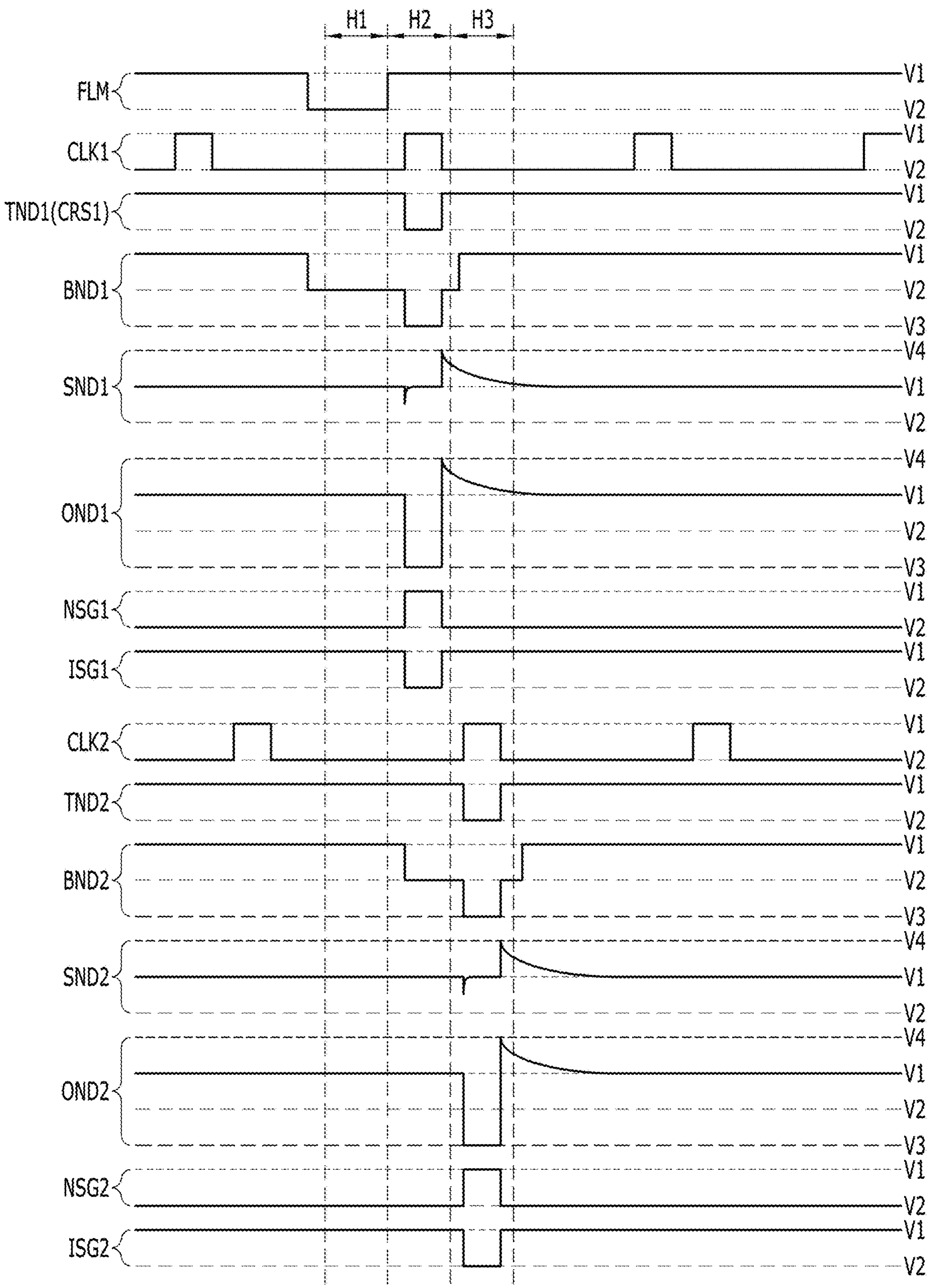
FIG. 7 is an example timing diagram illustrating the operation of the first stage and the second stage according to an embodiment of the present disclosure.
Figure 8A:
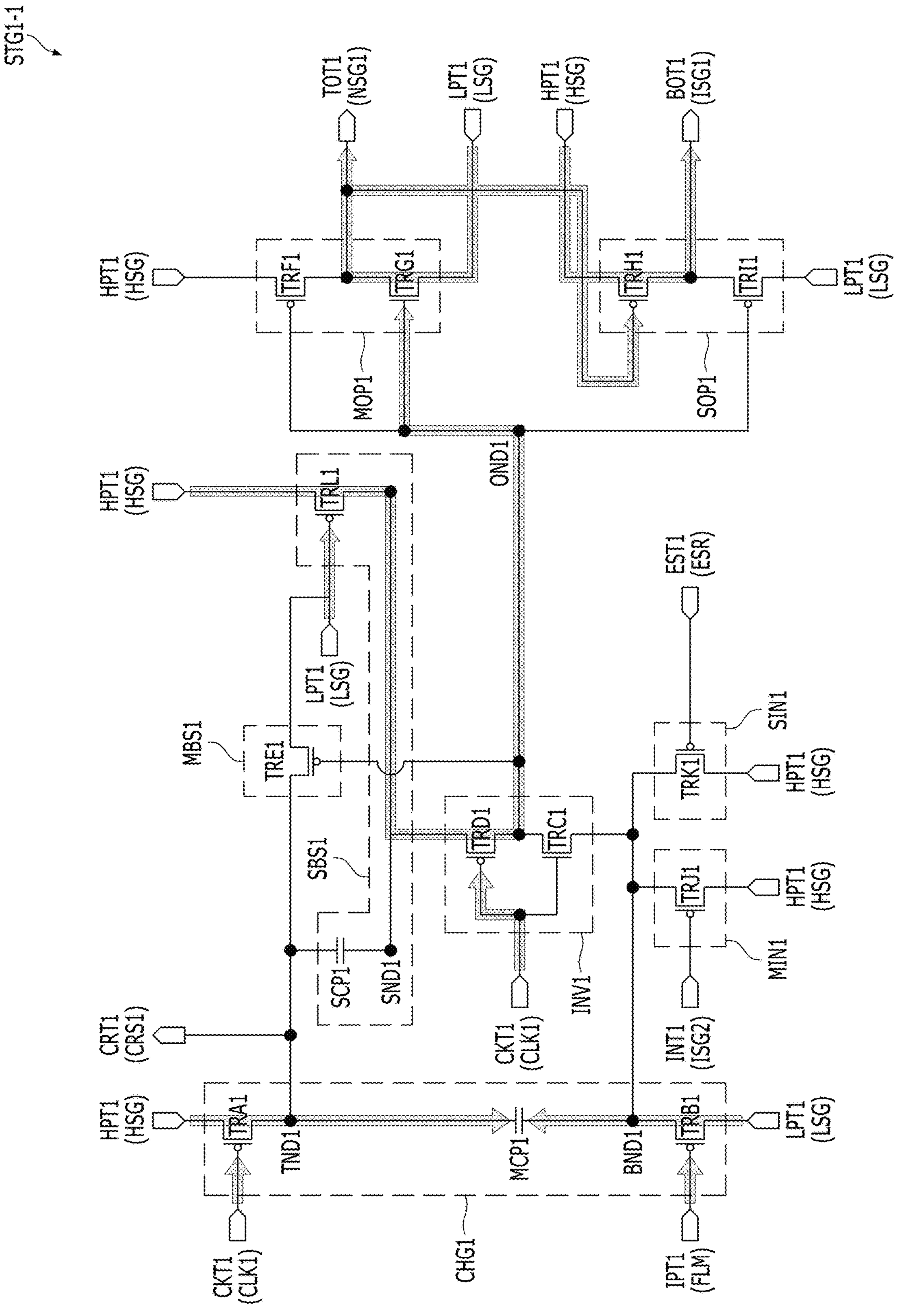
FIGS. 8A to 8C are example circuit diagrams illustrating the operation of the first stage and the second stage according to an embodiment of the present disclosure.
Figure 8B:
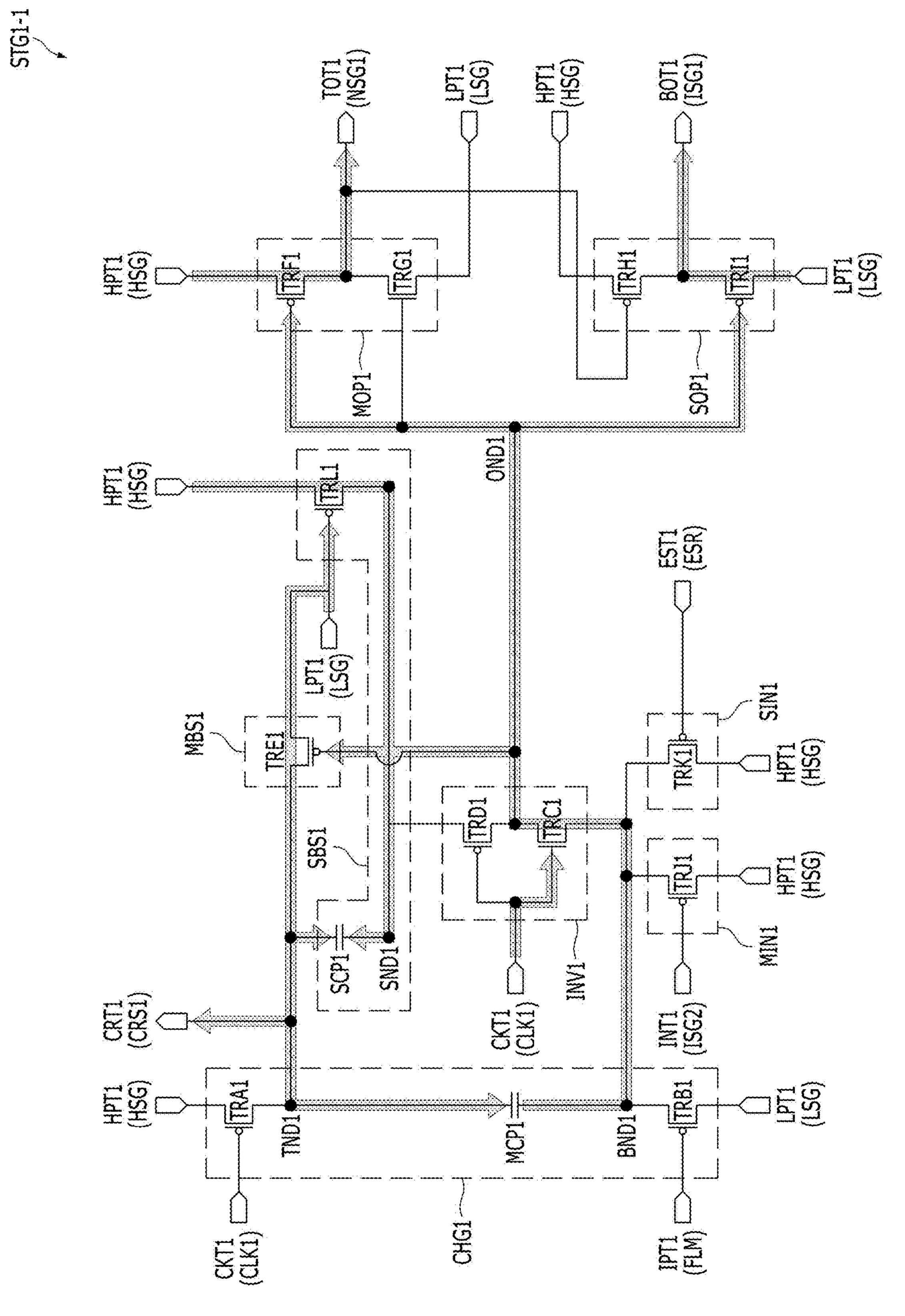
Figure 8C:
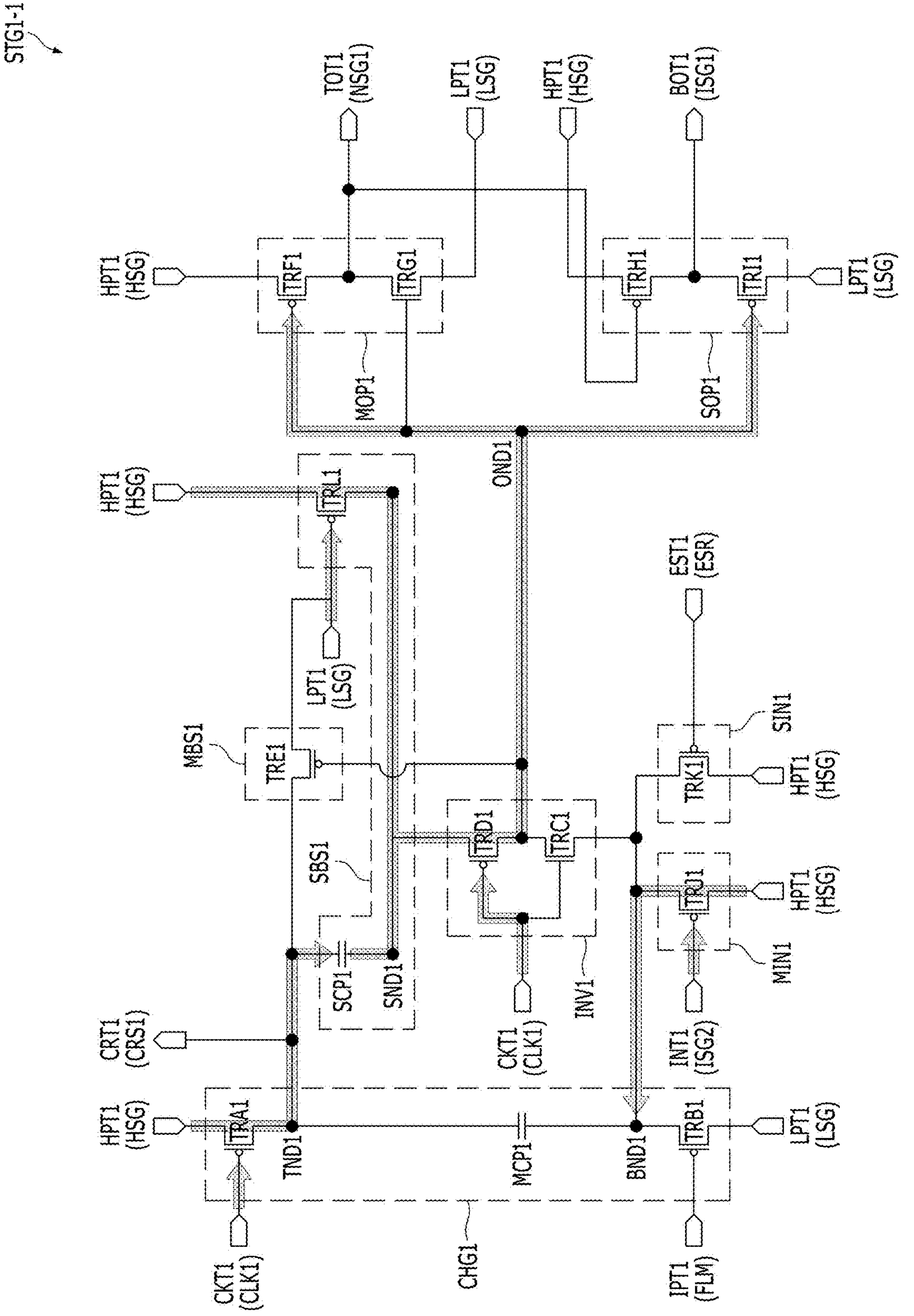

FIG. 7 is an example timing diagram illustrating the operation of the first stage STG1-1 and the second stage STG2-1. FIGS. 8A to 8C are example circuit diagrams illustrating the operation of the first stage STG1-1.

In a first horizontal period H1, the first main capacitor MCP1 may be charged. Hereinafter, the operation of the first stage STG1-1 in the first horizontal period H1 will be described in detail with reference to FIGS. 7 and 8A.

The first clock terminal CKT1 receives the first clock signal CLK1, and the first input terminal IPT1 receives the start signal FLM. In the first horizontal period H1, when both the first clock signal CLK1 and the initiation signal FLM have the second potential V2, the first upper input transistor TRA1 turns on to transfer the high signal HSG to the first upper charging node TND1, and the first lower input transistor TRB1 turns on to transfer the high signal HSG to the first lower charging node BND1. Accordingly, a charge amount corresponding to the potential difference between the high signal HSG and the low signal LSG may be charged in the first main capacitor MCP1. That is, as a voltage corresponding to the difference between the first potential and the second potential (i.e., V1-V2) is applied to the first main capacitor MCP1, the first main capacitor MCP1 may be charged.

The first upper inverting transistor TRD1 turns on in response to the first clock signal CLK1 to transfer the high signal HSG to the first output node OND1. The potential of the first output node OND1 causes the first lower main output transistor TRG1 and the first upper sub-output transistor TRH1 to turn on.

Accordingly, the first stage STG1-1 provides the low signal LSG as the first non-inverted output signal NSG1 to at least one of the plurality of pixels PX1-PXn through the first upper output terminal TOT1. Moreover, the first stage STG1-1 provides the high signal HSG as the first inverted output signal ISG1 to at least one of the plurality of pixels PX1-PXn through the first lower output terminal BOT1.

In a second horizontal period H2, the potential of the first output node OND1 may change from the first potential V1 to the third potential V3 due to the voltage applied to the first main capacitor MCP1, and the first sub-capacitor SCP1 may be charged. Hereinafter, the operations of the first stage STG1-1 and the second stage STG2-1 in the second horizontal period H2 will be described in detail with reference to FIGS. 7 and 8B.

In the second horizontal period H2, when both the first clock signal CLK1 and the initiation signal FLM have the first potential V1, the first upper input transistor TRA1 and the first lower input transistor TRB1 turn off, and the first lower inverting transistor TRC1 turns on. Since the first lower inverting transistor TRC1 turns on to electrically connect the first lower charging node BND1 to the first output node OND1, the potential of the first lower charging node BND1 may be transferred to the first output node OND1. Accordingly, the potential of the first output node OND1 may be changed to the second potential V2.

Subsequently, once the first main boosting transistor TRE1 turns on based on the potential of the first output node OND1, the low signal LSG is transferred to the first upper charging node TND1, thereby changing the potential of the first upper charging node TND1 to the second potential V2 and changing the potential of both the first lower charging node BND1 and the first output node OND1 to the third potential V3.

The first upper main output transistor TRF1 and the first lower sub-output transistor TRI1 turn on based on the potential of the first output node OND1. The first stage STG1-1 provides the first non-inverted output signal NSG1 to at least one of the plurality of pixels PX1-PXn through the first upper output terminal TOT1 and provides the first inverted output signal ISG1 to at least one of the plurality of pixels PX1-PXn through the first lower output terminal BOT1.

Moreover, since the low signal LSG is transferred to the first upper charging node TND1 and the high signal HSG is transferred to the first sub-boosting node SND1, a charge amount corresponding to the potential difference between the high signal HSG and the low signal LSG is charged in the first sub-capacitor SCP1. That is, the charge amount corresponding to the difference between the first potential V1 and the second potential V2 is charged in the first sub-capacitor SCP1.

Furthermore, the low signal LSG is transferred as the first carry signal CRS1 to the second input terminal IPT2 of the second stage STG2-1 through the first carry terminal CRT1. Accordingly, the second main capacitor MCP2 of the second stage STG2-1 is charged. Since the process of charging the second main capacitor MCP2 of the second stage STG2-1 in the second horizontal period H2 is substantially the same as the process of charging the first main capacitor MCP1 in the first horizontal period H1, the detailed description thereof will be omitted.

In a third horizontal period H3, the second main capacitor MCP2 of the second stage STG2-1 may be charged, the first main capacitor MCP1 of the first stage STG1-1 may be discharged, and the first upper main output transistor TRF1 and the first lower sub-output transistor TRI1 of the first stage STG1-1 may turn off. Hereinafter, the operation of the first stage STG1-1 in the third horizontal period H3 will be described in detail with reference to FIGS. 7 and 8C.

When the first clock signal CLK1 has the second potential V2, the first upper inverting transistor TRD1 turns on, and thus the first sub-boosting node SND1 is electrically connected to the first output node OND1. Accordingly, the potential of the first upper charging node TND1 changes from the second potential V2 to the first potential V1, and the potential of the first sub-boosting node SND1 changes from the first potential V1 to a fourth potential V4.

The first upper inverting transistor TRD1 turns on in response to the first clock signal CLK1 to transfer the high signal HSG to the first output node OND1. Each of the first lower main output transistor TRG1 and the first upper sub-output transistor TRH1 turns on based on the potential of the first output node OND1.

Accordingly, the first stage STG1-1 provides the low signal LSG as the first non-inverted output signal NSG1 to at least one of the plurality of pixels PX1-PXn through the first upper output terminal TOT1. Moreover, the first stage STG1-1 provides the high signal HSG as the first inverted output signal ISG1 to at least one of the plurality of pixels PX1-PXn through the first lower output terminal BOT1.

Based on the fourth potential V4 of the first sub-boosting node SND1, the first upper main output transistor TRF1 and the first lower sub-output transistor TRI1 turn off, whereas the absolute value of the fourth potential V4 may be greater than the absolute value of the first potential V1.

Therefore, when the fourth potential V4 is applied to the first sub-boosting node SND1, the first upper main output transistor TRF1 and the first lower sub-output transistor TRI1 may turn off more quickly than when the first potential V1 or the second potential V2 is applied to the first sub-boosting node SND1. That is, with the present disclosure, since the electrical signal for turning off the first upper main output transistor TRF1 and the first lower sub-output transistor TRI1 is amplified, the operation speed of the gate driving circuit GDC may be improved.

Moreover, the second main capacitor MCP2 of the second stage STG2-1 is charged. Subsequently, the process of the second stage STG2-1 providing the second non-inverted output signal NSG2 and the second inverted output signal ISG2 is substantially the same as the process of the first stage STG1-1 providing the first non-inverted output signal NSG1 and the first inverted output signal ISG1 in the second horizontal period H2, and thus the detailed description thereof will be omitted.

Furthermore, the first main capacitor MCP1 of the first stage STG1-1 is discharged. The first main initialization terminal INT1 receives the second inverted output signal ISG2 of the second stage STG2-1. Based on the potential of the first main initialization terminal INT1, the first main initialization transistor TRJ1 turns on, and Based on the potential of the first clock signal CLK1, the first upper input transistor TRA1 turns on. Accordingly, the potential of each of the first upper charging node TND1 and the first lower charging node BND1 changes to the first potential V1, causing the first main capacitor MCP1 to be discharged. That is, the first stage STG1-1 may be initialized by the second stage STG2-1.

Figure 9A:
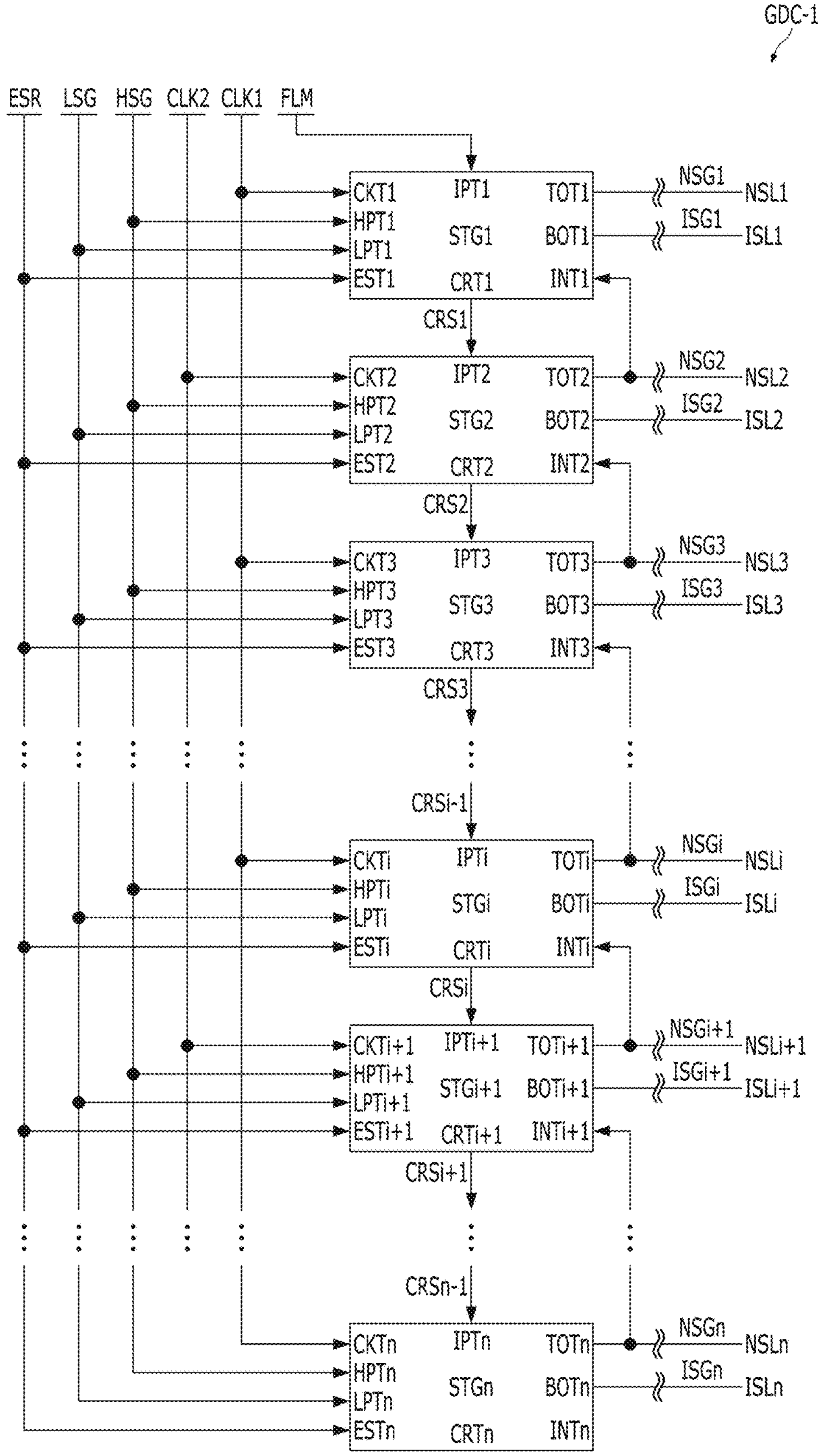
FIGS. 9A and 9B are example block diagrams illustrating a gate driving circuit according to an embodiment of the present disclosure.

FIG. 9A is an example block diagram illustrating a gate driving circuit GDC-1 according to an embodiment of the present disclosure. Referring to FIG. 9A, in an embodiment of the present disclosure, the third clock signal CLK3 may be omitted. The first stage STG1 and the second stage STG2 may each be one of a plurality of stages STG1 to STGn.

The first stage STG1 may be configured to receive the first clock signal CLK1, and the second stage STG2 may be configured to receive the second clock signal CLK2, wherein the first clock signal CLK1 and the second clock signal CLK2 may have different phases with respect to one another. That is, while the plurality of stages STG1-STGn in FIG. 2B may be configured to receive three clock signals CLK1, CLK2, CLK3 having different phases with respect to one another, the plurality of stages STG1-STGn in FIG. 9A may be configured to receive two clock signals CLK1, CLK2 having different phases with respect to one another.

Figure 9B:
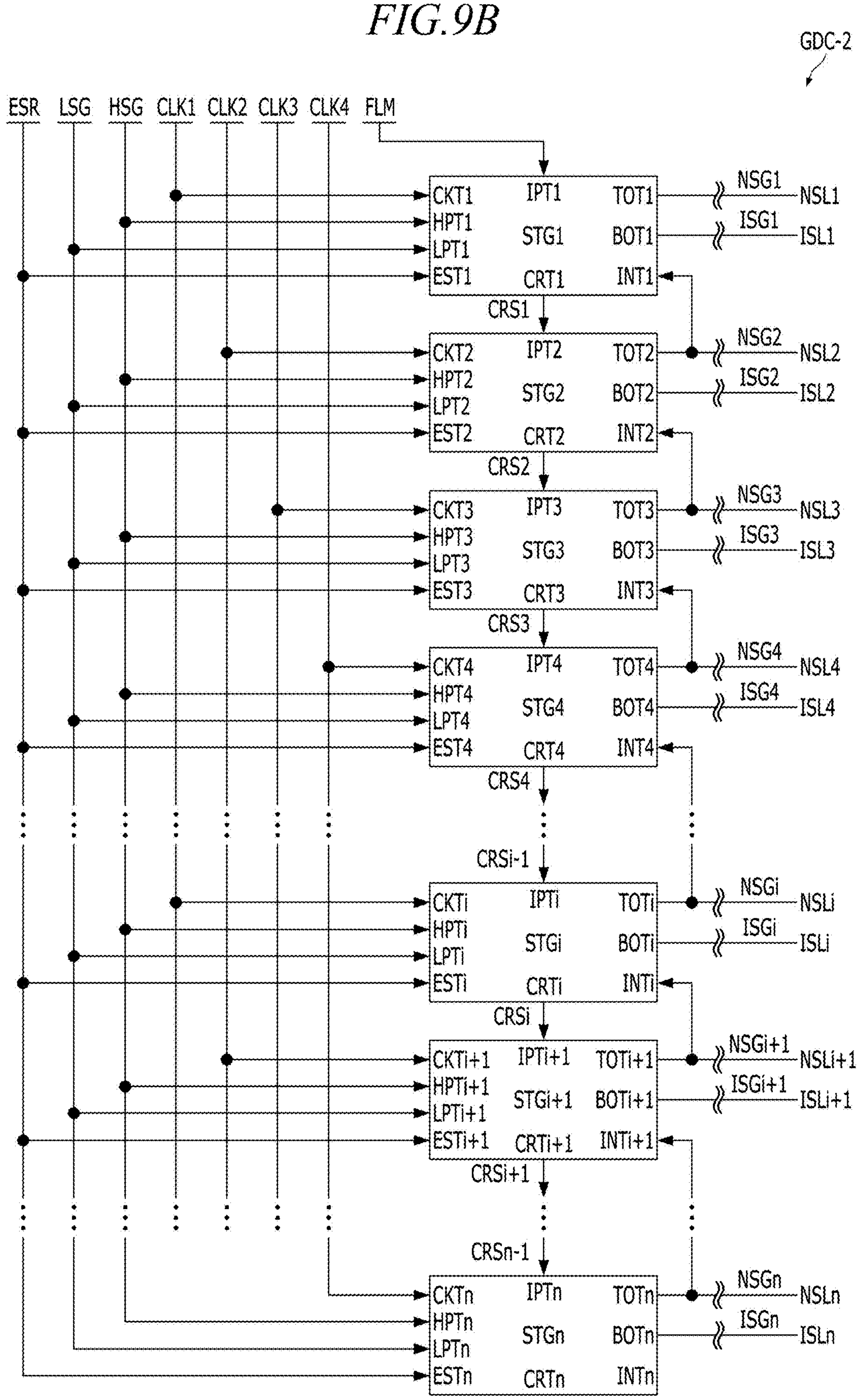

FIG. 9B is an example block diagram illustrating a gate driving circuit GDC-2 according to an embodiment of the present disclosure. Referring to FIG. 9B, in an embodiment of the present disclosure, the plurality of stages STG1-STGn may be configured to further receive a fourth clock signal CLK4. The first to fourth clock signals CLK1-CLK4 may have different phases with respect to one another. The first stage STG1, the second stage STG2, the third stage STG3, and the fourth stage STG4 may each be one of the plurality of stages STG1-STGn.

The first stage STG1 may be configured to receive the first clock signal CLK1, the second stage STG2 may be configured to receive the second clock signal CLK2, the third stage STG3 may be configured to receive the third clock signal CLK3, and the fourth stage STG4 may be configured to receive the fourth clock signal CLK4. That is, while the plurality of stages STG1-STGn in FIG. 2B may be configured to receive three clock signals CLK1, CLK2, CLK3 having different phases with respect to one another, the plurality of stages STG1-STGn in FIG. 9B may be configured to receive four clock signals CLK1, CLK2, CLK3, CLK4 having different phases with respect to one another.

In an embodiment of the present disclosure, the fourth clock signal CLK4 may be an electrical signal which swings between the first potential V1 and the second potential V2. The fourth clock signal CLK4, the first clock signal CLK1, the second clock signal CLK2, and the third clock signal CLK3 may have different phases with respect to one another. In an embodiment of the present disclosure, the duration TM1 for which the fourth clock signal CLK4 is maintained at the first potential V1 may be shorter than the duration TM2 for which the first clock signal CLK1 is maintained at the second potential V2.

Figure 10A:
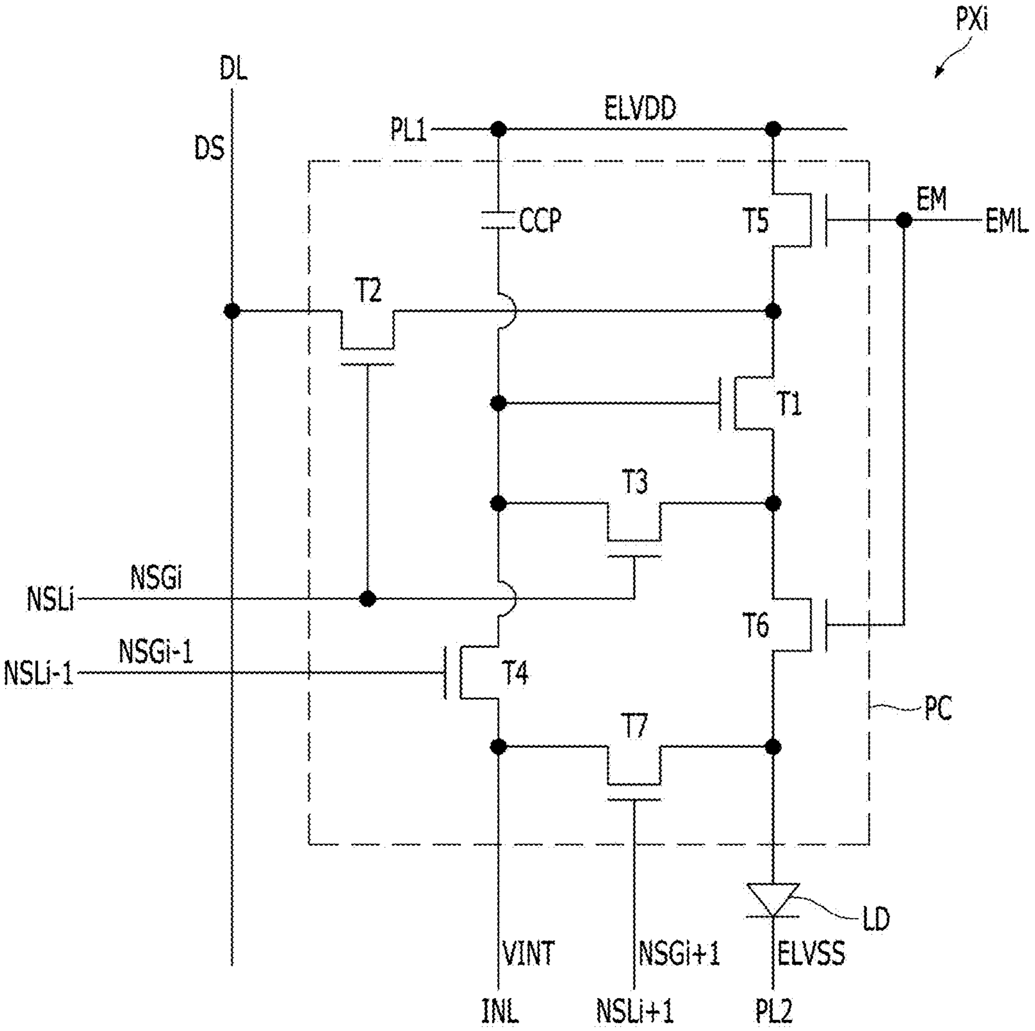
FIGS. 10A and 10B are example equivalent circuit diagrams illustrating an i-th pixel according to an embodiment of the present disclosure.
Figure 10B:
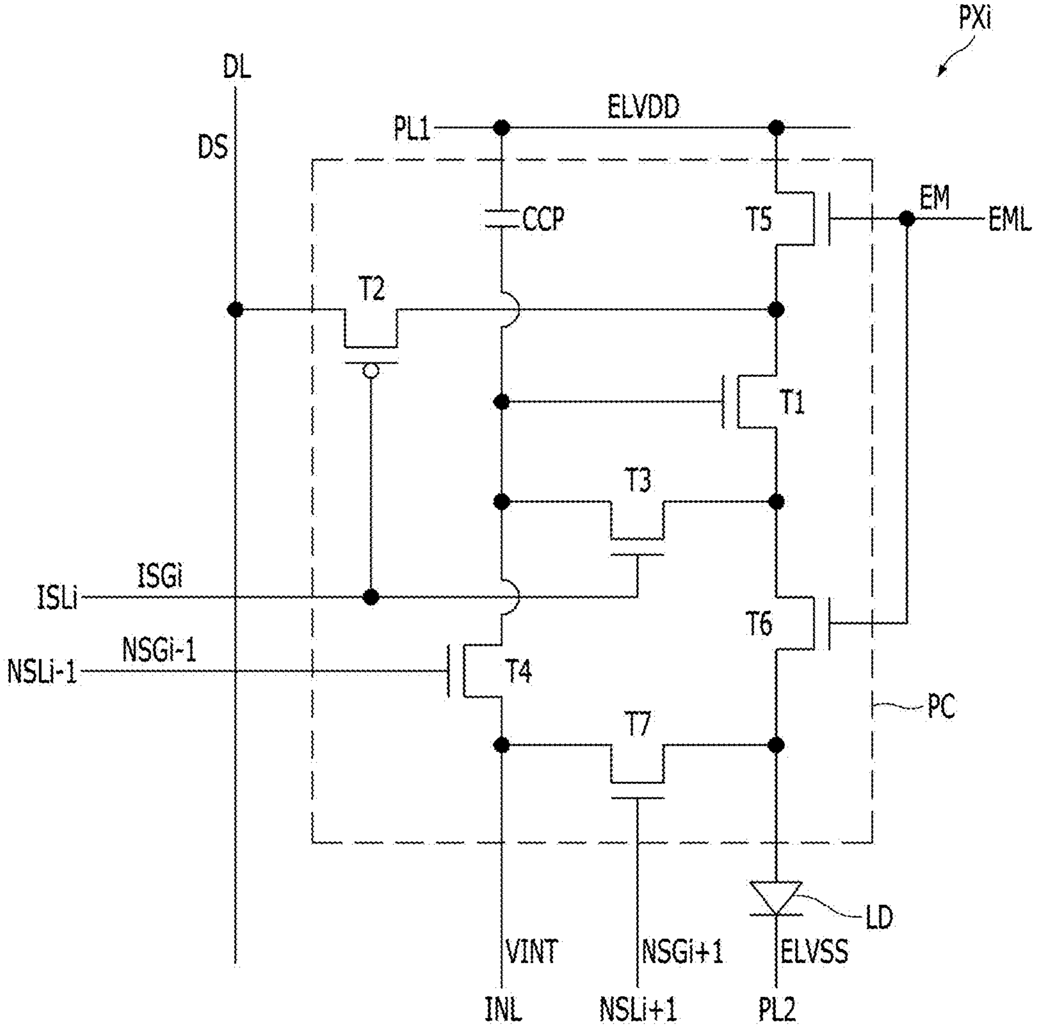

FIGS. 10A and 10B are example equivalent circuit diagrams of an i-th pixel PXi according to an embodiment of the present disclosure. In an embodiment of the present disclosure, at least some of the second transistor T2, third transistor T3, fourth transistor T4, and seventh transistor T7 may be controlled by the i-th non-inverted output signal NSGi or the i-th inverted output signal ISGi.

Referring to FIG. 10A, the i-th pixel PXi may include a light-emitting diode LD and a pixel circuit PC.

In the pixel circuit PC of FIG. 2A, the second transistor T2 may be controlled by the non-inverted output signal NSGi, and the third transistor T3, which is a P-channel MOSFET (PMOS), may be controlled by the i-th inverted output signal ISGi. In the pixel circuit PC of FIG. 10A, the third transistor T3 is an N-channel MOSFET (NMOS), and both the second transistor T2 and the third transistor T3 may be controlled by the non-inverted output signal NSGi.

Although it is illustrated in FIG. 10A that the second transistor T2 and the third transistor T3 are controlled by the non-inverted output signal NSGi, this is an example, and the pixel circuit PC of embodiments of the present disclosure are not limited thereto. In another embodiment of the present disclosure, the second transistor T2 and the third transistor T3 may be controlled by the i-th inverted output signal ISGi.

Referring to FIG. 10B, the i-th pixel PXi may include a light-emitting diode LD and a pixel circuit PC. In the pixel circuit PC of FIG. 2A, the second transistor T2, which is an N-channel MOSFET (NMOS), may be controlled by the non-inverted output signal NSGi, and the third transistor T3 may be controlled by the i-th inverted output signal ISGi. In the pixel circuit PC of FIG. 10B, the second transistor T2 is a P-channel MOSFET (PMOS), and both the second transistor T2 and the third transistor T3 may be controlled by the inverted output signal ISGi.

In the case where the pixel circuit PC includes both an N-channel MOSFET (NMOS) and a P-channel MOSFET (PMOS), both an inverted signal and a non-inverted signal are provided to the pixel circuit PC in order to control the NMOS and PMOS transistors.

In conventional gate driving circuits, a single stage provides only one of the inverted signal and the non-inverted signal. Since the inverted signal and the non-inverted signal are provided in different stages, deviations in operation time may occur among pixels. In contrast, the gate driving circuit GDC of the present disclosure may allow a single stage to provide both the inverted signal and the non-inverted signal. In the present disclosure, since both the inverted signal and the non-inverted signal are provided in a single stage, the operation time of each pixel may be uniformly controlled.

Although it is illustrated in FIG. 10B that the second transistor T2 and the third transistor T3 are controlled by the inverted output signal ISGi, this is an example, and the pixel circuit PC of embodiments of the present disclosure are not limited thereto. In another embodiment of the present disclosure, the second transistor T2 and the third transistor T3 may be controlled by the i-th non-inverted output signal NSGi.

Figure 11A:
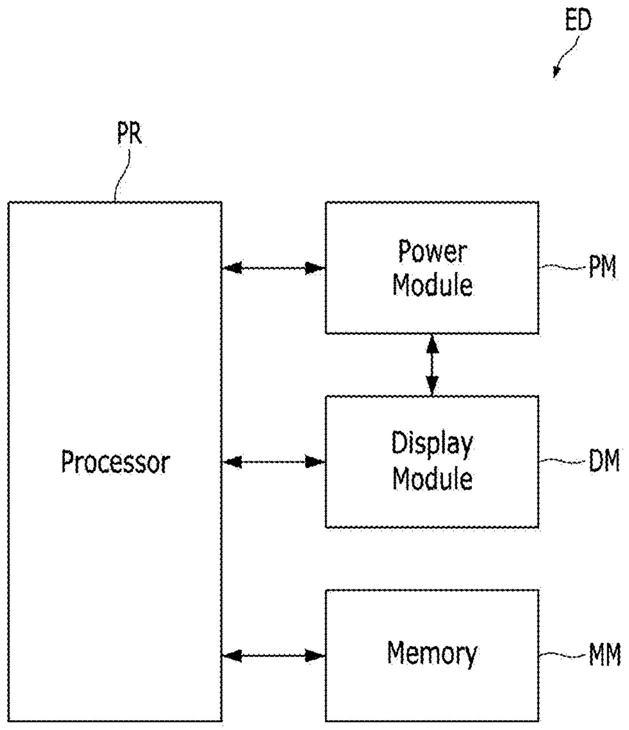
FIG. 11A is an example block diagram illustrating an electronic device according to an embodiment of the present disclosure.

FIG. 11A is an example block diagram illustrating an electronic device ED according to an embodiment of the present disclosure. Referring to FIG. 11A, the electronic device ED according to an embodiment may include a display module DM, a processor PR, a memory MM, and a power module PM.

The processor PR may include at least one of a central processing unit (CPU), an application processor (AP), a graphic processing unit (GPU), a communication processor (CP), an image signal processor (ISP), or a controller. The processor PR may be configured to provide the first clock signal CLK1, the second clock signal CLK2, the third clock signal CLK3, and the fourth clock signal CLK4 to the gate driving circuit GDC.

The memory MM may have stored therein data and information supportive of the operation of the processor PR or the display module DM. Once the processor PR executes an application stored in the memory MM, a video data signal and/or an input control signal may be transferred to the display module DM, and the display module DM may be configured to process the received signal and output image information through the display screen.

The power module PM may include a power supply module, such as a power adapter or a battery device, and a power conversion module configured to convert the power supplied by the power supply module into a power source supportive of the operation of the electronic device ED. The power module PM may be configured to provide the high signal HSG and the low signal LSG to the gate driving circuit GDC.

At least one of the aforementioned components of the electronic device ED may be included in the display device according to the embodiments described herein. In some aspects, some of the individual modules functionally included within a single module may be incorporated within the display device, while others may be provided separately from the display device. For example, the display device may include the display module DM, while the processor PR, memory MM, and power module PM may be provided as components of another device within the electronic device ED rather than the display device.

Figure 11B:
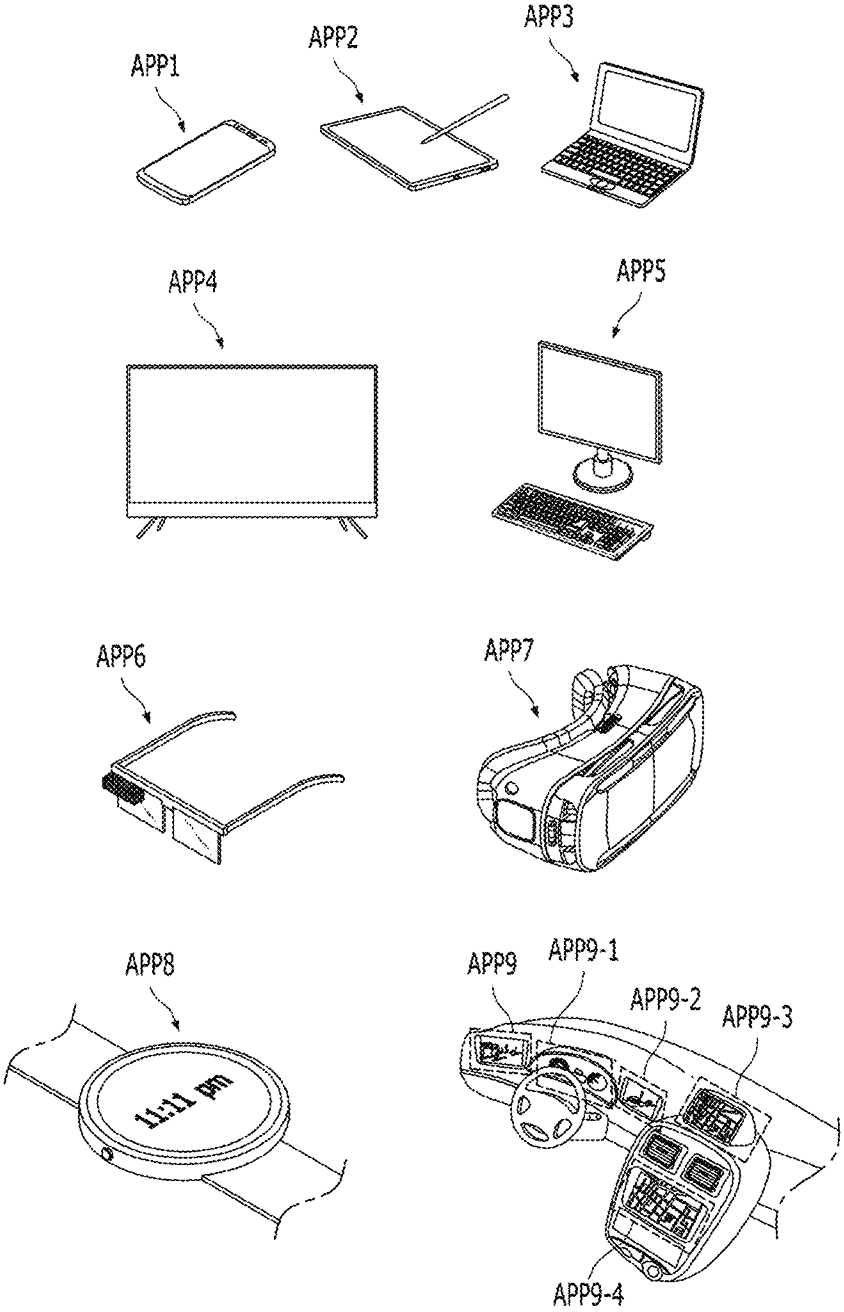
FIG. 11B illustrates various electronic devices according to embodiments of the present disclosure.

FIG. 11B illustrates various electronic devices ED according to embodiments of the present disclosure. Referring to FIG. 11B, various electronic devices ED incorporating the display module DM according to embodiments of the present disclosure may include image displaying electronic devices such as a smartphone APP1, a tablet PC APP2, a laptop computer APP3, a TV APP4, and a desktop monitor APP5, as well as wearable electronic devices incorporating the display module DM, such as smart glasses APP6, a head-mounted display APP7, and a smartwatch APP8. Further, the display module DM may also be applied to vehicle electronic devices APP9-APP9-4, such as an instrument panel, a center information display (CID) positioned on a center fascia or dashboard, or a room mirror display.

While certain embodiments of the present disclosure have been described herein, anyone ordinarily skilled in the art to which the present disclosure pertains shall appreciate that there may be a variety of modifications and permutations of the present disclosure without departing from the technical ideas and scopes of the present disclosure that are defined in the appended claims. Moreover, it shall be appreciated that the disclosed embodiments are not intended to restrict the present disclosure thereto and that every technical idea within the appended claims and their equivalents is interpreted to be included in the scope of the present disclosure.

What is claimed is:

1. A display module comprising:

a plurality of pixels; and a gate driving circuit, wherein:

the gate driving circuit comprises a plurality of stages electrically connected with the plurality of pixels, a first stage among the plurality of stages receives a high signal having a first potential, a low signal having a second potential lower than the first potential, and a first clock signal, the first stage comprises:

a first charging unit comprising a first main capacitor disposed between a first upper charging node and a first lower charging node;

a first inverting unit which transfers the high signal to a first output node or electrically connects the first lower charging node to the first output node based on the first clock signal;

a first main boosting unit which transfers the low signal to the first upper charging node in accordance with a potential of the first output node;

a first main output unit which provides a first non-inverted output signal to at least one of the plurality of pixels based on the potential of the first output node; and a first sub-output unit which provides a first inverted output signal to at least one of the plurality of pixels in accordance with the potential of the first output node and the potential of the first non-inverted output signal, and one of the first non-inverted output signal and the first inverted output signal is the high signal, and the other of the first non-inverted output signal and the first inverted output signal is the low signal.

2. The display module of claim 1, wherein:

the first charging unit charges the first main capacitor with a charge amount corresponding to a potential difference between the high signal and the low signal in response to one of an initialization signal and a carry signal and the first clock signal, and the carry signal is an electrical signal received from a stage other than the first stage among the plurality of stages.

3. The display module of claim 1, wherein:

the first main output unit comprises a first upper main output transistor and a first lower main output transistor, one of the first upper main output transistor and the first lower main output transistor turns on while the other of the first upper main output transistor and the first lower main output transistor turns off, based on the potential of the first output node, the first sub-output unit comprises a first upper sub-output transistor and a first lower sub-output transistor, and the first upper sub-output transistor is controlled by the potential of the first non-inverted output signal and provides the high signal as the first inverted output signal based on the potential of the first non-inverted output signal, and the first lower sub-output transistor is controlled by the potential of the first output node and provides the low signal as the first inverted output signal based on the potential of the first output node.

4. The display module of claim 1, wherein:

a second stage among the plurality of stages receives the high signal, the low signal, and a second clock signal, and the second stage comprises:

a second charging unit comprising a second main capacitor disposed between a second upper charging node and a second lower charging node;

a second inverting unit which transfers the high signal to a second output node or electrically connects the second lower charging node to the second output node based on the second clock signal;

a second main boosting unit which transfers the low signal to the second upper charging node based on the potential of the second output node;

a second main output unit which provides a second non-inverted output signal to at least one of the plurality of pixels based on the potential of the second output node; and a second sub-output unit which provides a second inverted output signal to at least one of the plurality of pixels based on the potential of the second output node and the potential of the second non-inverted output signal, wherein one of the second non-inverted output signal and the second inverted output signal is the high signal, and the other of the second non-inverted output signal and the second inverted output signal is the low signal, wherein:

the first stage further comprises a first main initialization unit, and the first main initialization unit provides the high signal to the first lower charging node based on one of the second non-inverted output signal and the second inverted output signal.

5. The display module of claim 4, wherein the first clock signal and the second clock signal have different phases with respect to one another.

6. The display module of claim 1, wherein:

the first stage is further provided with a stage initialization signal, and the first stage further comprises a first sub-initialization unit which transfers the high signal to the first lower charging node based on the stage initialization signal.

7. The display module of claim 1, wherein:

the first clock signal is an electrical signal which swings between the first potential and the second potential, and a duration for which the potential of the first clock signal is maintained at the first potential is shorter than a duration for which the potential of the first clock signal is maintained at the second potential.

8. The display module of claim 1, wherein:

the first stage further comprises a first sub-boosting unit comprising a first sub-capacitor, the first sub-capacitor is disposed between the first upper charging node and a first sub-boosting node, and the first sub-boosting node is electrically connected with the first inverting unit, wherein the first sub-capacitor is charged or the first sub-boosting node is electrically connected to the first output node according to the first clock signal.

9. A display module comprising:

a plurality of pixels; and a gate driving circuit, wherein:

the gate driving circuit comprises a plurality of stages electrically connected with the plurality of pixels, and a first stage among the plurality of stages comprises:

a first upper output terminal which transfers a first non-inverted output signal to at least one of the plurality of pixels;

a first carry terminal electrically connected to a first upper charging node and a second stage among the plurality of stages;

a first high-potential terminal configured to receive a high signal having a first potential;

a first low-potential terminal configured to receive a low signal having a second potential lower than the first potential;

a first clock terminal configured to receive a first clock signal;

a first input terminal configured to receive one of an initialization signal and a carry signal, wherein the carry signal is an electrical signal received from a stage other than the first stage among the plurality of stages;

a first upper input transistor disposed between the first high-potential terminal and the first upper charging node and which turns on or turns off in response to the first clock signal;

a first lower input transistor disposed between a first lower charging node insulated from the first upper charging node and the first low-potential terminal and which turns on or turns off based on a potential of the first input terminal;

a first main capacitor disposed between the first upper input transistor and the first lower input transistor;

a first lower inverting transistor disposed between the first lower charging node and a first output node and which turns on or turns off based on a potential of the first clock terminal;

a first upper inverting transistor disposed between the first lower inverting transistor and the first high-potential terminal and which turns on or turns off based on a potential of the first clock terminal;

a first main boosting transistor disposed between the first low-potential terminal and the first upper charging node and which turns on or turns off based on a potential of the first output node;

a first upper main output transistor disposed between the first high-potential terminal and the first upper output terminal and which turns on or turns off based on a potential of the first output node; and a first lower main output transistor disposed between the first low-potential terminal and the first upper output terminal and which turns on or turns off based on a potential of the first output node.

10. The display module of claim 9, further comprising:

a first lower output terminal which transfers a first inverted output signal to at least one of the plurality of pixels;

a first upper sub-output transistor disposed between the first high-potential terminal and the first lower output terminal and which turns on or turns off based on a potential of the first non-inverted output signal; and a first lower sub-output transistor disposed between the first low-potential terminal and the first lower output terminal and which turns on or turns off based on a potential of the first output node.

11. The display module of claim 9, wherein:

one of the first upper main output transistor and the first lower main output transistor is an N-type metal-oxide-semiconductor (NMOS) transistor, and the other of the first upper main output transistor and the first lower main output transistor is a P-type metal-oxide-semiconductor (PMOS) transistor.

12. The display module of claim 9, wherein:

the first upper main output transistor and the first lower main output transistor are controlled such that one of the first upper main output transistor and the first lower main output transistor turns on and the other the first upper main output transistor and the first lower main output transistor turns off based on a potential of the first output node, and one of the first non-inverted output signal and a first inverted output signal is the high signal and the other of the first non-inverted output signal and the first inverted output signal is the low signal.

13. The display module of claim 12, wherein the second stage comprises:

a second upper output terminal which transfers a second non-inverted output signal to at least one of the plurality of pixels;

a second lower output terminal which transfers a second inverted output signal to at least one of the plurality of pixels;

a second high-potential terminal configured to receive the high signal;

a second low-potential terminal configured to receive the low signal;

a second clock terminal configured to receive a second clock signal;

a second input terminal electrically connected with the first carry terminal of the first stage;

a second upper input transistor disposed between the second high-potential terminal and a second upper charging node and which turns on or turns off in response to the second clock signal;

a second lower input transistor disposed between a second lower charging node insulated from the second upper charging node and the second low-potential terminal and which turns on or turns off based on a potential of the second input terminal;

a second main capacitor disposed between the second upper input transistor and the second lower input transistor;

a second lower inverting transistor disposed between the second lower charging node and a second output node and which turns on or turns off based on a potential of the second clock terminal;

a second upper inverting transistor disposed between the second lower inverting transistor and the second high-potential terminal and which turns on or turns off based on a potential of the second clock terminal;

a second main boosting transistor disposed between the second low-potential terminal and the second upper charging node and which turns on or turns off based on a potential of the second output node;

a second upper main output transistor disposed between the second high-potential terminal and the second upper output terminal and which turns on or turns off based on a potential of the second output node;

a second lower main output transistor disposed between the second low-potential terminal and the second upper output terminal and which turns on or turns off based on a potential of the second output node;

a second upper sub-output transistor disposed between the second high-potential terminal and the second lower output terminal and which turns on or turns off based on a potential of the second non-inverted output signal; and a second lower sub-output transistor disposed between the second low-potential terminal and the second lower output terminal and which turns on or turns off based on a potential of the second output node, wherein the first stage further comprises:

a first main initialization terminal electrically connected to one of the second upper output terminal and the second lower output terminal; and a first main initialization transistor disposed between the first lower charging node and the first high-potential terminal and which turns on or turns off based on a potential of the first main initialization terminal.

14. The display module of claim 13, wherein the first clock signal and the second clock signal have different phases with respect to one another.

15. The display module of claim 13, wherein:

the first clock signal is an electrical signal which swings between the first potential and the second potential, and a duration for which the potential of the first clock signal is maintained at the first potential is shorter than a duration for which the potential of the first clock signal is maintained at the second potential, and the second clock signal is an electrical signal which swings between the first potential and the second potential, and a duration for which the potential of the second clock signal is maintained at the first potential is shorter than a duration for which the potential of the second clock signal is maintained at the second potential.

16. The display module of claim 13, wherein the first stage further comprises:

a first sub-initialization terminal configured to receive a stage initialization signal; and a first sub-initialization transistor disposed between the first lower charging node and the first high-potential terminal and which turns on or turns off based on a potential of the first sub-initialization terminal.

17. The display module of claim 16, wherein the first stage further comprises a first sub-capacitor disposed between the first upper charging node and the first upper inverting transistor.

18. An electronic device comprising:

a display module configured to emit light;

a processor configured to control the display module;

a memory having data for operation of the display module or the processor stored therein; and a power module configured to generate or supply power, wherein:

the display module comprises a plurality of pixels and a gate driving circuit, the gate driving circuit comprises a plurality of stages electrically connected with the plurality of pixels, a first stage among the plurality of stages receives a high signal having a first potential, a low signal having a second potential lower than the first potential, and a first clock signal, the first stage comprises:

a first charging unit comprising a first main capacitor disposed between a first upper charging node and a first lower charging node;

a first inverting unit which transfers the high signal to a first output node or electrically connects the first lower charging node to the first output node in response to the first clock signal;

a first main boosting unit which transfers the low signal to the first upper charging node based on a potential of the first output node;

a first main output unit which provides a first non-inverted output signal to at least one of the plurality of pixels based on a potential of the first output node; and a first sub-output unit which provides a first inverted output signal to at least one of the plurality of pixels based on a potential of the first output node and a potential of the first non-inverted output signal, and one of the first non-inverted output signal and the first inverted output signal is the high signal, and the other of the first non-inverted output signal and the first inverted output signal is the low signal.

19. The electronic device of claim 18, wherein:

the first main output unit comprises a first upper main output transistor and a first lower main output transistor, the first upper main output transistor and the first lower main output transistor are controlled such that one of the first upper main output transistor and the first lower main output transistor turns on and the other of the first upper main output transistor and the first lower main output transistor turns off based on a potential of the first output node, the first sub-output unit comprises a first upper sub-output transistor and a first lower sub-output transistor, the first upper sub-output transistor is controlled to provide the high signal as the first inverted output signal based on a potential of the first non-inverted output signal, and the first lower sub-output transistor is controlled to provide the low signal as the first inverted output signal based on a potential of the first output node.

20. The electronic device of claim 19, wherein:

the first stage further comprises a first sub-boosting unit comprising a first sub-capacitor, the first sub-capacitor is disposed between the first upper charging node and a first sub-boosting node, and the first sub-boosting node is electrically connected to the first inverting unit, and the first sub-capacitor is charged or the first sub-boosting node is electrically connected to the first output node according to the first clock signal.

* * * * *